(12) United States Patent
Scalisi

(10) Patent No.: US 11,074,790 B2
(45) Date of Patent: Jul. 27, 2021

(54) DOORBELL COMMUNICATION SYSTEMS AND METHODS

(71) Applicant: SKYBELL TECHNOLOGIES IP, LLC, Irvine, CA (US)

(72) Inventor: Joseph Frank Scalisi, Yorba Linda, CA (US)

(73) Assignee: SkyBell Technologies IP, LLC, Irvine, CA (US)

( * ) Notice: Subject to any disclaimer, the term of this patent is extended or adjusted under 35 U.S.C. 154(b) by 0 days.

(21) Appl. No.: 17/001,676

(22) Filed: Aug. 24, 2020

(65) Prior Publication Data

US 2021/0056819 A1    Feb. 25, 2021

Related U.S. Application Data

(60) Provisional application No. 62/891,344, filed on Aug. 24, 2019.

(51) Int. Cl.
| | | |
|---|---|---|
| *G08B 5/22* | (2006.01) | |
| *H04N 5/225* | (2006.01) | |
| *H04N 9/31* | (2006.01) | |
| *G08B 5/36* | (2006.01) | |

(52) U.S. Cl.
CPC ............ *G08B 5/222* (2013.01); *G08B 5/36* (2013.01); *H04N 5/2253* (2013.01); *H04N 9/3194* (2013.01)

(58) Field of Classification Search
CPC ..................................................... G08B 5/222
See application file for complete search history.

(56) References Cited

U.S. PATENT DOCUMENTS

| | | |
|---|---|---|
| 1,647,558 A | 11/1927 | Best |
| 1,647,708 A | 11/1927 | Monica |
| 3,240,113 A | 3/1966 | Stechemesser |
| 3,708,742 A | 1/1973 | Gunn |

(Continued)

FOREIGN PATENT DOCUMENTS

| | | | |
|---|---|---|---|
| CN | 2131143 Y | | 4/1993 |
| CN | 2304927 Y | * | 1/1999 |

(Continued)

OTHER PUBLICATIONS

Craig & Comapny—Home Tech: Doorbot—Downloaded on Nov. 18, 2013 from http://www.craigncompany.com/home-tech-doorbot/; prior art publication at least as of Jun. 10, 2013.

(Continued)

*Primary Examiner* — John W Miller
*Assistant Examiner* — Justin B Sanders
(74) *Attorney, Agent, or Firm* — Wesley E. Schwie, Esq.; Gallium Law

(57) ABSTRACT

A doorbell system may project an illumination on a surface. The doorbell may include a housing, a button, a camera, a microphone, a speaker, a motion detector, and a light source. In some embodiments, the doorbell includes at least one lens coupled to a bottom surface of the housing adjacent the light source. The at least one lens may be configured to allow light from the light source to pass through the at least one lens such that when the electronic doorbell is attached to a building the light source projects an illumination onto a ground surface in front of the doorbell.

20 Claims, 12 Drawing Sheets

(56) References Cited

U.S. PATENT DOCUMENTS

| | | |
|---|---|---|
| 4,523,193 A | 6/1985 | Levinson |
| D283,130 S | 3/1986 | Boenning |
| D297,222 S | 8/1988 | Rauch |
| 4,843,461 A | 6/1989 | Tatsumi |
| 4,982,092 A | 1/1991 | Jehle |
| 5,210,520 A | 5/1993 | Housley |
| 5,428,388 A | 6/1995 | Von Bauer |
| 5,493,618 A | 2/1996 | Stevens |
| 5,521,578 A | 5/1996 | Delvalle |
| D371,086 S | 6/1996 | Collins |
| 5,602,580 A | 2/1997 | Tseng |
| D381,638 S | 7/1997 | Kruse |
| 5,774,569 A | 6/1998 | Waldenmaier |
| 5,781,108 A | 7/1998 | Jacob |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,313,743 B1 | 11/2001 | Abraham-Fuchs |
| 6,375,366 B1 | 4/2002 | Kato |
| 6,414,589 B1 | 7/2002 | Angott |
| 6,429,893 B1 | 8/2002 | Xin |
| 6,535,243 B1 | 3/2003 | Tullis |
| 6,542,078 B2 | 4/2003 | Script |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| 6,812,970 B1 | 11/2004 | McBride |
| 6,828,909 B2 | 12/2004 | Script |
| D500,751 S | 1/2005 | Yukikado |
| D501,652 S | 2/2005 | Pierson |
| 6,870,488 B1 | 3/2005 | Compton |
| 6,928,461 B2 | 8/2005 | Tuli |
| 6,930,599 B2 | 8/2005 | Naidoo |
| 6,993,123 B1 | 1/2006 | Allen |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,154,531 B2 | 12/2006 | Laird |
| 7,193,644 B2 | 3/2007 | Carter |
| 7,218,220 B1 | 5/2007 | Bovsun |
| D562,306 S | 2/2008 | Jeong |
| 7,330,112 B1 | 2/2008 | Emigh |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,440,025 B2 | 10/2008 | Cheng |
| 7,460,149 B1 | 12/2008 | Donovan |
| 7,477,134 B2 | 1/2009 | Langer |
| 7,486,271 B2 | 2/2009 | Hershkovitz |
| 7,492,303 B1 | 2/2009 | Levitan |
| D588,574 S | 3/2009 | Takahata |
| 7,526,102 B2 | 4/2009 | Ozer |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,751,285 B1 | 7/2010 | Cain |
| 7,752,070 B2 | 7/2010 | Hatcher |
| 7,809,966 B2 | 10/2010 | Imao |
| 7,826,729 B2 | 11/2010 | Cullen |
| 7,956,576 B2 | 6/2011 | Neu |
| 7,991,381 B1 | 8/2011 | Dunne |
| 7,991,575 B2 | 8/2011 | Vogel |
| 8,016,676 B2 | 9/2011 | Carter |
| 8,125,329 B1 | 2/2012 | Hirou |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,224,311 B2 | 7/2012 | Majmundar |
| 8,237,574 B2 | 8/2012 | Anderson |
| 8,334,656 B2 | 12/2012 | Weiss |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,630,452 B2 | 1/2014 | Mardirossian |
| 8,665,333 B1 | 3/2014 | Sharma |
| 8,669,876 B2 | 3/2014 | Anderson |
| D707,147 S | 6/2014 | Crippa |
| 8,780,201 B1 | 7/2014 | Scalisi |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi |
| 8,842,180 B1 | 9/2014 | Kasmir |
| 8,866,598 B2 | 10/2014 | Collins |
| 8,872,915 B1 | 10/2014 | Scalisi |
| 8,875,208 B1 | 10/2014 | Abkairov |
| 8,937,659 B1 | 1/2015 | Scalisi |
| 8,941,736 B1 | 1/2015 | Scalisi |
| 8,947,530 B1 | 2/2015 | Scalisi |
| 8,953,040 B1 | 2/2015 | Scalisi |
| 8,976,244 B2 | 3/2015 | Felt |
| 9,013,575 B2 | 4/2015 | Scalisi |
| 9,021,134 B1 | 4/2015 | Patel |
| 9,049,352 B2 | 6/2015 | Scalisi |
| 9,053,622 B2 | 6/2015 | Scalisi |
| 9,055,202 B1 | 6/2015 | Scalisi |
| 9,057,210 B2 | 6/2015 | Dumas |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir |
| 9,071,923 B2 | 6/2015 | Zhang |
| 9,113,051 B1 | 8/2015 | Scalisi |
| 9,113,052 B1 | 8/2015 | Scalisi |
| 9,142,214 B2 | 9/2015 | Scalisi |
| 9,172,922 B1 | 10/2015 | Kasmir |
| 9,196,104 B2 | 11/2015 | Dumas |
| 9,218,696 B2 | 12/2015 | Dumas |
| 9,230,424 B1 | 1/2016 | Scalisi |
| 9,282,665 B1 | 3/2016 | Ladanyi |
| 9,336,637 B2 | 5/2016 | Neil |
| 9,338,594 B1 | 5/2016 | Onnen |
| 9,584,775 B2 | 2/2017 | Siminoff |
| 9,615,199 B1 | 4/2017 | Haney |
| D788,061 S | 5/2017 | Siminoff |
| D789,404 S | 6/2017 | Modestine |
| D789,820 S | 6/2017 | Siminoff |
| 9,674,433 B1 | 6/2017 | De La Cruz |
| D791,165 S | 7/2017 | Modestine |
| D791,240 S | 7/2017 | Lemberger |
| D791,241 S | 7/2017 | Lemberger |
| D791,243 S | 7/2017 | Loew |
| D791,878 S | 7/2017 | Loew |
| 9,697,723 B1 | 7/2017 | Ladanyi |
| 9,734,675 B2 | 8/2017 | Siminoff |
| D798,177 S | 9/2017 | Siminoff |
| 9,761,092 B2 | 9/2017 | Chen |
| 9,810,887 B1 | 11/2017 | Abdala |
| 9,978,260 B2 | 5/2018 | Lee |
| 10,289,917 B1 | 5/2019 | Fu |
| 10,367,814 B2 | 7/2019 | Walker |

(56) References Cited

U.S. PATENT DOCUMENTS

| | | |
|---|---|---|
| 2001/0010555 A1 | 8/2001 | Driscoll |
| 2001/0022627 A1 | 9/2001 | Bernhardt |
| 2002/0097161 A1 | 7/2002 | Deeds |
| 2003/0009364 A1 | 1/2003 | Miyoshi |
| 2003/0025599 A1 | 2/2003 | Monroe |
| 2003/0081952 A1 | 5/2003 | Geng |
| 2003/0169178 A1 | 9/2003 | Jensen |
| 2004/0085205 A1 | 5/2004 | Yeh |
| 2004/0085449 A1 | 5/2004 | Millet |
| 2004/0086093 A1 | 5/2004 | Schranz |
| 2004/0095254 A1 | 5/2004 | Maruszczak |
| 2004/0117039 A1 | 6/2004 | Hantke |
| 2004/0178889 A1 | 9/2004 | Buckingham |
| 2004/0229569 A1 | 11/2004 | Franz |
| 2004/0257336 A1 | 12/2004 | Hershkovitz |
| 2004/0257670 A1 * | 12/2004 | Kawakami ............. G02B 13/16 359/680 |
| 2005/0006528 A1 | 1/2005 | Movsesian |
| 2005/0007451 A1 | 1/2005 | Chiang |
| 2005/0040954 A1 | 2/2005 | McNally |
| 2005/0046584 A1 | 3/2005 | Breed |
| 2005/0057361 A1 | 3/2005 | Giraldo |
| 2005/0071879 A1 | 3/2005 | Haldavnekar |
| 2005/0097248 A1 | 5/2005 | Kelley |
| 2005/0116480 A1 | 6/2005 | Deng |
| 2005/0237208 A1 | 10/2005 | Wojcik |
| 2005/0259641 A1 | 11/2005 | Beninato |
| 2005/0267605 A1 | 12/2005 | Lee |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0063517 A1 | 3/2006 | Oh |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0187034 A1 | 8/2006 | Styers |
| 2006/0195872 A1 | 8/2006 | Seo |
| 2006/0271678 A1 | 11/2006 | Jessup |
| 2006/0273895 A1 | 12/2006 | Kollin |
| 2007/0008081 A1 | 1/2007 | Tylicki |
| 2007/0012602 A1 | 1/2007 | Baldassari |
| 2007/0025712 A1 | 2/2007 | Jezierski |
| 2007/0029486 A1 | 2/2007 | Zhevelev |
| 2007/0046442 A1 | 3/2007 | Bartorelli |
| 2007/0052531 A1 | 3/2007 | Matthews |
| 2007/0066316 A1 | 3/2007 | Hoover |
| 2007/0103541 A1 | 5/2007 | Carter |
| 2007/0109441 A1 | 5/2007 | Cheng |
| 2007/0118831 A1 | 5/2007 | Kondo |
| 2007/0126574 A1 | 6/2007 | Langer |
| 2007/0132413 A1 | 6/2007 | Mays |
| 2007/0146115 A1 | 6/2007 | Roosli |
| 2007/0146122 A1 | 6/2007 | Ratner |
| 2007/0176778 A1 | 8/2007 | Ando |
| 2007/0194945 A1 | 8/2007 | Atkinson |
| 2007/0206510 A1 | 9/2007 | Morris |
| 2007/0216764 A1 | 9/2007 | Kwak |
| 2007/0237358 A1 | 10/2007 | Tseng |
| 2008/0004995 A1 | 1/2008 | Klingenberg |
| 2008/0028063 A1 | 1/2008 | Holmes |
| 2008/0036862 A1 | 2/2008 | Lang |
| 2008/0047287 A1 | 2/2008 | Ruppert |
| 2008/0128586 A1 | 6/2008 | Johnson |
| 2008/0129498 A1 | 6/2008 | Howarter |
| 2008/0129825 A1 | 6/2008 | Deangelis |
| 2008/0136915 A1 | 6/2008 | Iwamura |
| 2008/0145050 A1 | 6/2008 | Mayer |
| 2008/0157936 A1 | 7/2008 | Ebrom |
| 2008/0157956 A1 | 7/2008 | Radivojevic |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0167862 A1 | 7/2009 | Jentoft |
| 2009/0207249 A1 | 8/2009 | Erel |
| 2009/0213208 A1 | 8/2009 | Glatt |
| 2009/0243852 A1 | 10/2009 | Haupt |
| 2009/0273670 A1 | 11/2009 | Tamayo |
| 2009/0284578 A1 | 11/2009 | Carter |
| 2009/0296641 A1 | 12/2009 | Bienas |
| 2009/0302995 A1 | 12/2009 | Park |
| 2009/0308116 A1 | 12/2009 | Lambrou |
| 2010/0087161 A1 | 4/2010 | Young |
| 2010/0103300 A1 | 4/2010 | Jones |
| 2010/0109903 A1 | 5/2010 | Carrick |
| 2010/0134072 A1 | 6/2010 | Neu |
| 2010/0141761 A1 | 6/2010 | McCormack |
| 2010/0195810 A1 | 8/2010 | Mota |
| 2010/0225455 A1 | 9/2010 | Claiborne |
| 2010/0245060 A1 | 9/2010 | Tylicki |
| 2010/0276570 A1 | 11/2010 | Moser |
| 2010/0289661 A1 | 11/2010 | Styers |
| 2011/0025852 A1 | 2/2011 | Tanaka |
| 2011/0028118 A1 | 2/2011 | Thomas |
| 2011/0074570 A1 | 3/2011 | Feldstein |
| 2011/0090085 A1 | 4/2011 | Belz |
| 2011/0121940 A1 | 5/2011 | Jones |
| 2011/0140845 A1 | 6/2011 | Sanders |
| 2011/0156566 A1 | 6/2011 | Chen |
| 2011/0176011 A1 | 7/2011 | Swamidas |
| 2011/0207509 A1 | 8/2011 | Crawford |
| 2011/0221582 A1 | 9/2011 | Chuey |
| 2011/0260880 A1 | 10/2011 | Dean |
| 2011/0264405 A1 | 10/2011 | Vogel |
| 2011/0287718 A1 | 11/2011 | Abel |
| 2011/0313775 A1 | 12/2011 | Laligand |
| 2012/0011559 A1 | 1/2012 | Miettinen |
| 2012/0027248 A1 | 2/2012 | Feris |
| 2012/0030133 A1 | 2/2012 | Rademaker |
| 2012/0044049 A1 | 2/2012 | Vig |
| 2012/0044050 A1 | 2/2012 | Vig |
| 2012/0044085 A1 | 2/2012 | Hung |
| 2012/0085824 A1 | 4/2012 | Handshaw |
| 2012/0098439 A1 | 4/2012 | Recker |
| 2012/0105631 A1 | 5/2012 | Hutchings |
| 2012/0108215 A1 | 5/2012 | Kameli |
| 2012/0113253 A1 | 5/2012 | Slater |
| 2012/0127308 A1 | 5/2012 | Eldershaw |
| 2012/0162416 A1 | 6/2012 | Su |
| 2012/0182427 A1 | 7/2012 | Marshall |
| 2012/0200942 A1 | 8/2012 | Schmidt |
| 2012/0229282 A1 | 9/2012 | Zagami |
| 2012/0230203 A1 | 9/2012 | Casey |
| 2012/0230696 A1 | 9/2012 | Pederson |
| 2012/0262581 A1 | 10/2012 | Carter |
| 2012/0267962 A1 | 10/2012 | Hanchett |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0293310 A1 | 11/2012 | Fitzgibbon |
| 2012/0320150 A1 | 12/2012 | Montgomery |
| 2012/0327225 A1 | 12/2012 | Barley |
| 2012/0327246 A1 | 12/2012 | Senior |
| 2013/0017812 A1 | 1/2013 | Foster |
| 2013/0020875 A1 | 1/2013 | Wozniak |
| 2013/0039499 A1 | 2/2013 | Patenaude |
| 2013/0045763 A1 | 2/2013 | Ruiz |
| 2013/0057695 A1 | 3/2013 | Huisking |
| 2013/0057696 A1 | 3/2013 | Felt |
| 2013/0091213 A1 | 4/2013 | Diab |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147616 A1 | 6/2013 | Lambert |
| 2013/0147964 A1 | 6/2013 | Frank |
| 2013/0150686 A1 | 6/2013 | Fronterhouse |

(56) References Cited

U.S. PATENT DOCUMENTS

| | | |
|---|---|---|
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0223833 A1 | 8/2013 | Tenenbaum |
| 2013/0286211 A1 | 10/2013 | Cao |
| 2013/0293722 A1 | 11/2013 | Chen |
| 2013/0328522 A1 | 12/2013 | Brockman |
| 2013/0335219 A1 | 12/2013 | Malkowski |
| 2014/0009609 A1 | 1/2014 | Webster |
| 2014/0015967 A1 | 1/2014 | Moore |
| 2014/0070922 A1 | 3/2014 | Davis |
| 2014/0077929 A1 | 3/2014 | Dumas |
| 2014/0087780 A1 | 3/2014 | Abhyanker |
| 2014/0088761 A1 | 3/2014 | Shamlian |
| 2014/0118600 A1 | 5/2014 | Son |
| 2014/0125754 A1 | 5/2014 | Haywood |
| 2014/0149706 A1 | 5/2014 | Shim |
| 2014/0167676 A1 | 6/2014 | Mack |
| 2014/0188643 A1 | 7/2014 | Murphy |
| 2014/0210590 A1 | 7/2014 | Castro |
| 2014/0253725 A1 | 9/2014 | Hsu |
| 2014/0260449 A1 | 9/2014 | Uyeda |
| 2014/0265359 A1 | 9/2014 | Cheng |
| 2014/0266669 A1 | 9/2014 | Fadell |
| 2014/0266702 A1 | 9/2014 | Forster-Knight |
| 2014/0266767 A1 | 9/2014 | Huang |
| 2014/0267716 A1 | 9/2014 | Child |
| 2014/0267740 A1 | 9/2014 | Almomani |
| 2014/0285672 A1 | 9/2014 | Hogasten |
| 2014/0292194 A1 | 10/2014 | Sagal |
| 2014/0292481 A1 | 10/2014 | Dumas |
| 2014/0320663 A1 | 10/2014 | Chien |
| 2014/0334684 A1 | 11/2014 | Strimling |
| 2014/0340894 A1 | 11/2014 | Chien |
| 2014/0368643 A1 | 12/2014 | Siegel |
| 2015/0022319 A1 | 1/2015 | Chutorash |
| 2015/0022618 A1 | 1/2015 | Siminoff |
| 2015/0022620 A1 | 1/2015 | Siminoff |
| 2015/0027178 A1 | 1/2015 | Scalisi |
| 2015/0029335 A1 | 1/2015 | Kasmir |
| 2015/0035987 A1 | 2/2015 | Fernandez |
| 2015/0049191 A1 | 2/2015 | Scalisi |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0077220 A1 | 3/2015 | Davis |
| 2015/0084779 A1 | 3/2015 | Saladin |
| 2015/0092055 A1 | 4/2015 | Scalisi |
| 2015/0109104 A1 | 4/2015 | Fadell |
| 2015/0109111 A1 | 4/2015 | Lee |
| 2015/0109112 A1 | 4/2015 | Fadell |
| 2015/0112885 A1 | 4/2015 | Fadell |
| 2015/0120015 A1 | 4/2015 | Fadell |
| 2015/0120598 A1 | 4/2015 | Fadell |
| 2015/0127712 A1 | 5/2015 | Fadell |
| 2015/0145991 A1 | 5/2015 | Russell |
| 2015/0156030 A1 | 6/2015 | Fadell |
| 2015/0156031 A1 | 6/2015 | Fadell |
| 2015/0161856 A1 | 6/2015 | Wilson |
| 2015/0163463 A1 | 6/2015 | Hwang |
| 2015/0179031 A1 | 6/2015 | Wallace |
| 2015/0185964 A1 | 7/2015 | Stout |
| 2015/0194839 A1 | 7/2015 | Wojcik |
| 2015/0208032 A1 | 7/2015 | Gavney |
| 2015/0211259 A1 | 7/2015 | Dumas |
| 2015/0213658 A1 | 7/2015 | Dumas |
| 2015/0228281 A1 | 8/2015 | Raniere |
| 2015/0236966 A1 | 8/2015 | Francini |
| 2015/0275564 A1 | 10/2015 | Rosenthal |
| 2015/0276266 A1 | 10/2015 | Warren |
| 2015/0309487 A1 | 10/2015 | Lyman |
| 2015/0310381 A1 | 10/2015 | Lyman |
| 2015/0312531 A1 | 10/2015 | Samad |
| 2015/0338812 A1 | 11/2015 | Miura |
| 2015/0339895 A1 | 11/2015 | Chen |
| 2015/0347910 A1 | 12/2015 | Fadell |
| 2015/0364028 A1 | 12/2015 | Child |
| 2016/0001719 A1 | 1/2016 | Frost |
| 2016/0019495 A1 | 1/2016 | Kolchin |
| 2016/0057199 A1 | 2/2016 | Aziz |
| 2016/0058181 A1 | 3/2016 | Han |
| 2016/0073479 A1 | 3/2016 | Erchak |
| 2016/0078699 A1 | 3/2016 | Kalb |
| 2016/0104061 A1 | 4/2016 | McGill |
| 2016/0105644 A1 | 4/2016 | Smith |
| 2016/0125357 A1 | 5/2016 | Hall |
| 2016/0171435 A1 | 6/2016 | Newton |
| 2016/0171439 A1 | 6/2016 | Ladden |
| 2016/0191864 A1 | 6/2016 | Siminoff |
| 2016/0219254 A1 | 7/2016 | Hu |
| 2016/0235236 A1 | 8/2016 | Byers |
| 2016/0247344 A1 | 8/2016 | Eichenblatt |
| 2016/0261425 A1 | 9/2016 | Horton |
| 2016/0292936 A1 | 10/2016 | Palmer |
| 2016/0300187 A1 | 10/2016 | Kashi |
| 2016/0307380 A1 | 10/2016 | Ho |
| 2016/0314663 A1* | 10/2016 | Glencross .............. G03B 29/00 |
| 2016/0330403 A1 | 11/2016 | Siminoff |
| 2016/0366373 A1 | 12/2016 | Siminoff |
| 2017/0023780 A1 | 1/2017 | Braker |
| 2017/0064504 A1 | 3/2017 | Jose |
| 2017/0109984 A1 | 4/2017 | Child |
| 2017/0124510 A1 | 5/2017 | Caterino |
| 2017/0149855 A1 | 5/2017 | Doshi |
| 2017/0160137 A1 | 6/2017 | Jeong |
| 2017/0160138 A1 | 6/2017 | Jeong |
| 2017/0160144 A1 | 6/2017 | Jeong |
| 2017/0162225 A1 | 6/2017 | Jeong |
| 2017/0163944 A1 | 6/2017 | Jeong |
| 2017/0220872 A1 | 8/2017 | Child |
| 2017/0251035 A1 | 8/2017 | Siminoff |
| 2017/0251173 A1 | 8/2017 | Siminoff |
| 2017/0251182 A1 | 8/2017 | Siminoff |
| 2017/0272706 A1 | 9/2017 | Jeong |
| 2017/0280112 A1 | 9/2017 | Siminoff |
| 2017/0280565 A1 | 9/2017 | Tso |
| 2017/0293883 A1 | 10/2017 | Li |
| 2017/0294694 A1 | 10/2017 | Tso |
| 2018/0019889 A1 | 1/2018 | Burns |
| 2018/0032979 A1* | 2/2018 | Siminoff ................ H04N 9/802 |
| 2019/0066471 A1* | 2/2019 | Jeon ........................ G08B 1/08 |
| 2019/0206243 A1 | 7/2019 | Siminoff |

FOREIGN PATENT DOCUMENTS

| | | |
|---|---|---|
| CN | 2304927 Y | 1/1999 |
| CN | 1704985 A | 12/2005 |
| CN | 1902609 B | 5/2010 |
| CN | 202872976 U | 4/2013 |
| CN | 202939738 U | 5/2013 |
| EP | 0684743 B1 | 11/1995 |
| GB | 2400958 B | 7/2005 |
| WO | 2001093220 A1 | 12/2001 |
| WO | 2007111802 A2 | 10/2007 |
| WO | 2014062321 A1 | 4/2014 |
| WO | 2014107196 A1 | 7/2014 |
| WO | 2014144628 A2 | 9/2014 |
| WO | 2015023737 A1 | 2/2015 |
| WO | 2016032217 A1 | 3/2016 |

OTHER PUBLICATIONS

The Next Web—Hardware renaissance: A look at the Christie Street platform and doorbot video streaming doorbell—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.

(56) References Cited

OTHER PUBLICATIONS

Digital Trends—Doorbot wi-fi doorbell camera lets you see visitors on your smartphone—Downloaded on Nov. 18, 2013 from http://www.digitaltrends.com/lifestyle/doorbot-camera-see-visitors-smartphone/; prior art publication at least as of Dec. 9, 2012.
Doorbot website—Downloaded on Jul. 26, 2013 from http://www.getdoorbot.com.
Doorbot users manual—Downloaded on Nov. 18, 2013 from http://static.mydoorbot.com/DoorBot%20Users%20Manual%201.0.pdf.
Doorbot "fact sheet"—Downloaded on Nov. 18, 2013 from http://cdn.shopify.com/s/files/1/0247/6501/files/DoorBotMediaKit.pdf?17037.
CellNock—Index page—Originally downloaded on Sep. 23, 2013 from http://cellnock.com/index.html; The website says CellNock is "patent pending".
CellNock website—downloaded on Nov. 18, 2013 from http://cellnock.com/; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
Skybel—MySkyBell.com (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
Mybells—Downloaded on Nov. 18, 2013 from http://www.indiegogo.com/projects/mybells-the-smart-bells.
Wireless Video Doorbell Pager—Downloaded on Aug. 9, 2013 from http://www.indiegogo.com/projects/wireless-video-doorbell-pager--4.
Lockitron—Downloaded on Jul. 24, 2013 from https://lockitron.com/preorder.
Eyetalk for Home—Downloaded May 24, 2013 from http://www.revolutionaryconceptsinc.com/forhome.html.
Smartbell—Downloaded on Dec. 5, 2013 from http://smartbell.co/.
Smartbell—A Doorbell for Smartphones, published by Scrambled Brains Tech, LLC., Oct. 1, 2013.
August Smart Lock—Downloaded on Jun. 10, 2014 from www.August.com.
August Smart Lock—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
AdaFruit—Lock-Style Solenoid—Downloaded on Aug. 22, 2014 from www.AdaFruit.com.
Wikipedia—Power Matters Alliance—Downloaded on Aug. 23, 2014 from www.wikipedia.com.
AdaFruit—Push-Pull Solenoid—Technical Details—Downloaded on Aug. 22, 2014 from www.AdaFruit.com.
Wikipedia—Qi—Downloaded on Aug. 23, 2014 from www.wikipedia.com.
TP-Link—Website—Downloaded on Jul. 15, 2014 from www.tp-link.us.
A HD Cameras—AC Adapter Spy Camera—Downloaded on Jun. 24, 2014 from ahdcameras.com.
Fanfare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Tech Crunch—Doorboot becomes Ring—Downloaded on Oct. 10, 2014 from http://techcrunch.com/2014109/29/doorbot-ring-home-security-doorbell/?ncid=rss&utm_source=feedburner&utm_medium=feed&utm_campaign=Feed.
iChime—iChime Customizable Digital Chime System—Downloaded on Nov. 7, 2014 from http://www.ichime.com/.
Christie Street—Doorbot—Downloaded on Jun. 14, 2013 from https://christiestreet.com/products/doorbot.
Idoorcam—A Wi-Fi Enabled, Webcam Doorbell—Downloaded on Sep. 3, 2013 from http://www.idoorcam.com/.
Langer—Langer Doorbell Button Sized Light—Downloaded on Sep. 16, 2013 from http://www.youtube.com/watch?v=u9nNCm4tSYI.
Langer—Langer Doorbell Light—Downloaded on Sep. 16, 2013 from http://www.youtube.com/watch?v=6dbU-Gyjgx8.
Smartbell—SmartBell on Kickstarter—Downloaded on Feb. 28, 2014 from http://www.kickstarter.com/projects/1256599792/smartbell-wi-fi-doorbell-for-video-chats-to-ios-an.
DefenDoor—DefenDoor by Glate LLC—Downloaded on Dec. 11, 2014 from https://www.kickstarter.com/projects/85455040/defendoor-a-home-security-system-that-syncs-with-y.
CNET—Notifi by Chamberlain—Downloaded on Jan. 9, 2015 from http://www.cnet.com/products/chamberlain-notifi-video-door-chime/.
I-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
Doorbird—Downloaded on Jan. 23, 2015 from http://www.doorbird.com/.
Chui Doorbell—Downloaded on Jan. 23, 2015 from http://www.getchui.com/.
Tech Crunch—Chui Doorbell—Downloaded on Jan. 23, 2015 from http://techcrunch.com/2014/04/18/214-technologies-is-crowdfunding-a-smart-doorbell-called-chui/.
Giz Mag—Downloaded on Jan. 23, 2015 from http://www.gizmag.com/gopano-micro-captures-360-degree-video-on-iphone/18542/.
SENGLED Snap Light Camera—Downloaded on Mar. 9, 2015 from http://www.sengled.com/product/snap.
CNET—Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Tech Crunch—Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.
CNIPA—China National Intellectual Property Administration; Notification of the Third Office Action of CN Application No. IIE151535; dated Nov. 15, 2019.
PCT International Search Report and Written Opinion in International Application No. PCT/US2020/047705, dated Nov. 6, 2020, 10 pages.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
Myintercom Video System—Downloaded on Jun. 8, 2015 from http://myintercom.de/en/funktionsweise.
Kocchi's Cobell Wi-Fi Doorbell—Downloaded on Sep. 14, 2015 from http://www.kocchis.com/Cobell_Manual.pdf.
August Doorbell Cam—Downloaded on Nov. 12, 2015 from http://august.com/products/august-doorbell/.
Nest Home Index—Downloaded on Nov. 12, 2015 from https://nest.com/blog/2015/11/09/the-first-nest-home-index/?utm_medium=paid%20social&utm_source=Facebook&utm_campaign=Nest%20Home%20Index&utm_content=Launch%20post.
Engadget—Amazon partners are reportedly exploring in-home deliveries—Downloaded on Oct. 19, 2017 from https://www.engadget.com/2016/09/27/amazon-august-garageio-inhome/; prior art publication at least as of Sep. 27, 2016.

(56) References Cited

OTHER PUBLICATIONS

Logittech—Logitech Circle 2—Downloaded on Oct. 19, 2017 from from https://www.logitech.com/en-us/product/circle-2-home-security-camera; prior art publication at least as of Jul. 26, 2017.
NY Times—Was That an Intruder or a Pet? The Security Cams That Can Tell—Downloaded on Oct. 19, 2017 from https://www.nytimes.com/2017/08/09/technology/personaltech/internet-connected-security-cameras-wirecutter.html?rref=collection%2Fsectioncollection%2Fpersonaltech, prior art publication at least as of Aug. 10, 2017.
Wisenet—SmartCam D1—Downloaded on Oct. 19, 2017 from http://www.wisenetlife.com/en-us/product/SmartCam/SNH-V6435DN;jsessionid=023065D418C9E9CA7335F6D9B4E2C8DC/faq/?currtPg=4; prior art publication at least as of Sep. 23, 2017.
Nortek Control—Go Control: Smart Doorbell Camera—Downloaded on Oct. 19, 2017 from https://www.nortekcontrol.com/pdf/literature/GC-DBC-1-GoControl-Smart-Doorbell-Camera-Spec-Sheet.pdf; prior art publication at least as of Dec. 18, 2016.
HSN—Samsung SmartCam High-Definition Video Doorbell—Downloaded on Oct. 25, 2017 from https://www.hsn.com/products/samsung-smartcam-high-definition-video-doorbell/8534791; prior art publication at least as of Oct. 22, 2017.
Wirecutter—The Best Smart Doorbell Camera—Downloaded on Oct. 25, 2017 from https://thewirecutter.com/reviews/best-smart-doorbell-camera/; prior art publication at least as of Oct. 19, 2017.
Newsday—Google's Nest launches video doorbell, new security system—Downloaded on Oct. 25, 2017 from https://www.newsday.com/lifestyle/google-s-nest-launches-video-doorbell-new-security-system-1.14498694; prior art publication at least as of Oct. 18, 2017.
ZD Net—Amazon to develop a smart doorbell to deliver packages inside your home—Downloaded on Oct. 25, 2017 from http://www.zdnet.com/article/amazon-plans-to-develop-smart-doorbell-to-deliver-packages-inside-your-home/, prior art publication at least as of Oct. 11, 2017.
Dealerscope—Petra Named Exclusive Distributor for New Uniden U-Bell DB1 Wireless Video Doorbell—Downloaded on Oct. 25, 2017 from http://www.dealerscope.com/article/petra-named-exclusive-distributor-new-uniden-u-bell-db1-wireless-video-doorbell/, prior art publication at least as of Oct. 3, 2017.
Nest—Say hello to Nest Hello—Downloaded on Oct. 25, 2017 from https://nest.com/blog/2017/09/20/say-hello-to-nest-hello/?utm_campaign=nest%20hello%20preannounce&utm_source=nest%20customers&utm_medium=m-email&utm_content=leam%20more; prior art publication at least as of Sep. 27, 2017.
Gate: Your Personal Doorman—Downloaded on Oct. 25, 2017 from https://www.indiegogo.com/projects/gate-your-personal-doorman#/; prior art publication at least as of Sep. 25, 2017.
Mashable—Walmart is teaming with a smart lock startup to deliver food straight to your fridge—Downloaded on Oct. 25, 2017 from http://mashable.com/2017/09/24/walmart-smart-lock-grocery-delivery/#7b0i0W4L_mqf; prior art publication at least as of Sep. 24, 2017.
Wired—Review: August Smart Lock—Downloaded on Oct. 25, 2017 from https://www.wired.com/2017/09/review-august-smart-lock/; prior art publication at least as of Sep. 24, 2017.
Amazon—Amazon Key—Downloaded on Oct. 25, 2017 from https://www.amazon.com/b?ie=UTF8&node=17285120011.
Amazon—Amazon Key In-Home Kit includes: Amazon Cloud Cam (Key Edition) indoor security camera and compatible smart lock—Downloaded on Oct. 25, 2017 from https://www.amazon.com/dp/B00KCYQGXE?locationCheckInvoked=1.
Amazon—Amazon Cloud Cam Indoor Security Camera, works with Alexa—Downloaded on Oct. 25, 2017 from https://www.amazon.com/Amazon-Cloud-Indoor-Security-Camera/dp/B01C4UY0JK/ref=sr_tr_1?s=amazon-devices&ie=UTF8&qid=1508945752&sr=1-1&keywords=amazon+cloud+cam.
Best Buy—Vivint Smart Home—Downloaded on Oct. 25, 2017 from https://www.bestbuy.com/site/home-security-solutions/smart-home/pcmcat748302047019.c?id=pcmcat748302047019&ref=P30T29R169&loc=BODY&CampaignID=860152&eut=2387920889; prior art publication at least as of Aug. 25, 2017.
Ring—Chime Pro—Downloaded on Oct. 25, 2017 from https://ring.comichime-pro; prior art publication at least as of Aug. 23, 2017.
Twice—Samsung Wisenet SmartCam D1 Video Doorbell—Downloaded on Oct. 25, 2017 from http://www.twice.com/news/smart-home/samsung-wisenet-smartcam-d1-video-doorbell/65643; prior art publication at least as of Jul. 31, 2017.
Tech Crunch—Ring adds three connected Spotlight Cams to its Floodlight Cam lineup—Downloaded on Oct. 25, 2017 from https://techcrunch.com/2017/07/31/ring-adds-three-connected-spotlight-cams-to-its-floodlight-cam-lineup/; prior art publication at least as of Aug. 2, 2017.
CNBC—This $200 'smart' doorbell will show you who (or what) is in front of your house at all times—Downloaded on Oct. 25, 2017 from https://www.cnbc.com/2017/07/23/ring-doorbell-2-review.html; prior art publication at least as of Jul. 23, 2017.
Zmodo—Greet Pro with Beam Alert—Downloaded on Oct. 25, 2017 from http://www.zmodo.com/greetpro-1080p-wifi-video-doorbell/.
August—August Doorbell Cam Pro—Downloaded on Oct. 25, 2017 from http://august.com/products/doorbell-camera/?utm source=Owners+from+Salesforce&utm_campaign=83b33655ed-EMAIL_CAMPAIGN_2017_06_06&utm_medium=email&utm_term=0_15a5cc0eb8-83b33655ed-247286221&mc_cid=83b33C55ed&mc_eid=9d prior art publication at least as of Jun. 11, 2017.
ATT—August Wi-Fi Doorbell Cam—Downloaded on Oct. 25, 2017 from https://m.att.com/shopmobile/accessories/specialty-items/August_Wi-Fi_Doorbell Cam/_jcr_content.html?referrer=https%253A%2F%2Fwww.google.com%2F; prior art publication at least as of Jun. 9, 2017.
Ding, a beautifully simple smart doorbell—Downloaded on Oct. 25, 2017 from https://www.indiegogo.com/projects/ding-a-beautifully-simple-smart-doorbell-home-technology#/; prior art publication at least as of Jun. 5, 2017.
Clare Controls—The Clare Video Doorbell—Downloaded on Oct. 25, 2017 from https://www.clarecontrols.com/video-doorbell; prior art publication at least as of Jun. 1, 2017.
Business Insider—The best security cameras you can buy for your home—Downloaded on Oct. 25, 2017 from http://www.businessinsider.com/best-security-camera-home/#the-best-home-security-camera-for-outdoors-and-indoors-2; prior art publication at least as of May 27, 2017.
Smanos—Smart Video Doorbell—Downloaded on Oct. 25, 2017 from http://www.smanos.com/doorbell; prior art publication at least as of May 22, 2017.
Ring—Products—Downloaded on Oct. 30, 2017 from https://ring.com/.
Honeywell RCWL105A1003/N Plug-in Wireless Doorbell / Door Chime and Push Button; Downloaded on Apr. 16, 2019 from https://www.amazon.com/Honeywell-RCWL105A1003-Plug-Wireless-Button/dp/B001GOMATM; Prior art at least as of Sep. 26, 2008.
Sado Tech Model C Wireless Doorbell Operating at over 500-feet Range with Over 50 Chimes, No Batteries Required for Receiver; Downloaded on Apr. 16, 2019 from https://www.amazon.com/SadoTech-Wireless-Doorbell-Operating-Batteries/dp/B00FR4YQYK; Prior art at least as of Oct. 10, 2013.
Zheludev; The life and times of the LED—a 100-year history; Nature Photonics; Apr. 2007, pp. 189-192; vol. 1; Nature Publishing Group; Retrieved Apr. 16, 2019.
Yam; Innovative Advances in LED Technology; Microelectronics journal; Nov. 9, 2004; pp. 129-137; vol. 36; Retrieved Apr. 16, 2019.
Perkin Elmer; LHi968—LHi 968 Dual Element Detector, Top Line; Prior art at least as of Mar. 18, 2007.
Perkin Elmer; Pyroelectric Infrared Detectors; Prior art at least as of Apr. 16, 2009.
Perkin Elmer; Dual Element Detector; Prior art at least as of Mar. 25, 2007.
IEEE Standards Association; IEEE 802.15.1-2002—IEEE Standard for Telecommunications and Information Exchange Between Systems—LAN/MAN—Specific Requirements—Part 15: Wireless Medium Access Control (MAC) and Physical Layer (PHY) Specifications for Wireless Personal Area Networks (WPANs); Downloaded on

(56) References Cited

OTHER PUBLICATIONS

Apr. 29, 2019 from https://standards.ieee.org/standard/802_15_1-2002.html ; Prior art at least as of Jun. 14, 2002.
Bluetooth—Our History; Prior art least as of Oct. 17, 2013.
Nutone—LA600WH Door Chime—Installation & Operating Instructions; Downloaded on Apr. 29, 2019 from http://www.nuton.com/common/productDigitalAssethandler.ashx?id=5b25a40a-c56f-44bf-99d1-5b0c17f266e9; Prior art at least as of Sep. 18, 2013.
Nutone; LA600WH Universal Wired/Wireless MP3 Doorbell Mechanism, 6"w x 9-1/2"h x 2-1/4"d in White; Downloaded on Apr. 29, 2019 from http://www.nutone.com/products/product/e2562b0e-4fe5-432a-ac70-228953b19875; Prior art at least as of May 30, 2013.
Intune; InTune MP3 Door Chime Manual; Downloaded on Apr. 29, 2019 from https://www.heath-zenith.com/system/spree/documents/attachments/000/000/839/original/205371-02A.pdf?1436551434 ; Prior art at least as of 2013.
Nutone; College Pride Mechanism; Prior art at least as of Jun. 8, 2013.
Seco-Larm; Enforcer DP-236Q Wireless Video Door Phone Manual; Downloaded on Apr. 29, 2019 from http://www.seco-larm.com/image/data/A_Documents/02_Manuals/MiDP-236Q_150528.pdf.

\* cited by examiner

DOORBELL COMMUNICATION SYSTEMS AND METHODS

CROSS-REFERENCE TO RELATED APPLICATIONS

This application claims the benefit of U.S. Provisional Patent Application No. 62/891,344; filed Aug. 24, 2019; entitled DOORBELL COMMUNICATION SYSTEMS AND METHODS. The entire contents of U.S. Provisional Patent Application No. 62/891,344 are incorporated by reference herein.

BACKGROUND

Field

Various embodiments disclosed herein relate to doorbells. Certain embodiments relate to doorbells including a light.

Description of Related Art

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted.

SUMMARY

In some embodiments, a doorbell system comprises an electronic doorbell, a visitor detection system coupled to the electronic doorbell, wherein the visitor detection system comprises at least one of a button, a camera, a microphone, and a motion detector, and a light communicatively coupled to at least one of the electronic doorbell and the visitor detection system, wherein the light is configured to project an illumination on a surface. When the electronic doorbell is attached to a building, the surface may comprise at least one of a floor, a ceiling, and at least one wall located adjacent to the electronic doorbell. In some embodiments, the light is configured to constantly project the illumination.

Alternatively, the light may be configured to project the illumination in response to at least one of a press of the button, an indication of a presence of a visitor by the camera, a detection of sound by the microphone, and a detection of motion by the motion detector. In some embodiments, the system further comprises a remote computing device communicatively coupled to the doorbell system, wherein the remote computing device is configured to run a mobile application. The light may be configured to project the illumination in response to activation of the mobile application.

In some embodiments, the system further comprises a lens coupled to a housing of the electronic doorbell and positioned such that the illumination is emitted through the lens and onto the surface. The lens may be detachably coupled to the housing. The system may further comprise at least one mechanical attachment threadably coupled to the housing, wherein the lens is adjustable in a first direction in response to rotating the at least one mechanical attachment in a first rotational direction and the lens is adjustable in a second direction in response to rotating the at least one mechanical attachment in a second rotational direction that is opposite the first rotational direction. In some embodiments, at least one of the lens and the light are detachably coupled to a bottom surface of the housing. Alternatively, at least one of the lens and the light may be detachably coupled to a top surface of the housing. Further, at least one of the lens and the light may be detachably coupled to at least one side surface of the housing.

A method of projecting an illumination by a doorbell system comprising an electronic doorbell, a visitor detection system coupled to the electronic doorbell wherein the visitor detection system comprises at least one of a button, a camera, a microphone, and a motion detector, and a light communicatively coupled to at least one of the electronic doorbell and the visitor detection system wherein the light is configured to project the illumination on a surface may comprise receiving, by the visitor detection system, a notification of a trigger event and in response to the receiving, projecting, by the light, the illumination on the surface.

In some embodiments, the trigger event comprises at least one of a press of the button, an indication recorded by the camera, a sound detected by the microphone, and a motion detected by the motion detector. Alternatively, the illumination may be projected in response to activation of a mobile application configured to run on a remote computing device. When the electronic doorbell is attached to a building, the illumination may be projected onto at least one of a floor, a ceiling, and at least one wall located adjacent to the electronic doorbell.

The method may further comprise emitting, by the light, the illumination through a lens and onto the surface, such that a design of the illumination is determined by the lens. In some embodiments, the design of the illumination comprises at least one of a message, a logo, and at least one color. The method may further comprise detachably coupling the lens to a housing of the electronic doorbell. In some embodiments, the method further comprises detachably coupling at least one of the lens and the light to a bottom surface of the housing. Alternatively, the method may comprise detachably coupling at least one of the lens and the light to a top surface of the housing. Further, in some embodiments, the method comprises detachably coupling at least one of the lens and the light to at least one side surface of the housing.

The method may further comprise threadably coupling at least one mechanical attachment to the housing. In some embodiments, the method further comprises rotating the at least one mechanical attachment in a first rotational direction. In response to rotating the at least one mechanical attachment in the first rotational direction, adjusting a lens may occur. In some embodiments, adjusting the lens comprises at least one of a movement in a left direction, a movement in a right direction, a movement in an upward direction, and a movement in a downward direction, zooming the lens inward, and zooming the lens outward.

The method may further comprise rotating the at least one mechanical attachment in a second rotational direction. In response to rotating the at least one mechanical attachment in the second rotational direction, adjusting a lens may occur. In some embodiments, adjusting the lens comprises at least one of a movement in a left direction, a movement in a right direction, a movement in an upward direction, a movement in a downward direction, zooming the lens inward, and zooming the lens outward.

In some embodiments, the trigger event comprises at least one of powering on the electronic doorbell and providing power to the electronic doorbell.

The disclosure also includes an electronic doorbell, comprising a housing, a button coupled to the housing, a camera coupled to the housing, a microphone coupled to the housing, a speaker coupled to the housing, a motion detector coupled to the housing, a light source coupled to the housing, and at least one lens coupled to a bottom surface of the housing adjacent the light source, wherein the at least one lens is configured to allow light from the light source to pass through the at least one lens such that when the electronic doorbell is attached to a building the light source projects an illumination onto a ground surface in front of the electronic doorbell.

In some embodiments, the doorbell includes a film coupled to the housing adjacent the at least one lens whereby the film comprises a light filter corresponding to the illumination.

The at least one lens may comprise at least one magnification lens configured to magnify the light from the light source. The at least one magnification lens may comprise a first magnification lens, a second magnification lens, and a third magnification lens.

In some embodiment, the least one lens comprises at least one focus lens configured to spread the light and focus the illumination onto the ground surface. In some embodiments, the light source is configured to constantly project the illumination. In some embodiments, the light source is configured to project the illumination in response to a press of the button. In some embodiments, the light source is configured to project the illumination in response to an indication of a presence of a visitor by the camera. In some embodiments, the light source is configured to project the illumination in response to a detection of a sound by the microphone. In some embodiments, the light source is configured to project the illumination in response to a detection of a motion by the motion detector.

In some embodiments, the electronic doorbell further comprises a remote computing device communicatively coupled to the electronic doorbell, wherein the remote computing device is configured to run a mobile application, wherein the electronic doorbell is configured to project the illumination in response to an input on the mobile application.

In some embodiments, the at least one lens is detachably coupled to the housing.

In some embodiments, the electronic doorbell further comprises at least one mechanical adjustment mechanism threadably coupled to the housing, wherein the at least one lens is adjustable in a first direction in response to rotating the at least one mechanical adjustment mechanism in a first rotational direction and the lens is adjustable in a second direction in response to rotating the at least one mechanical adjustment mechanism in a second rotational direction that is opposite the first rotational direction.

The disclosure also include a method of projecting an illumination by a doorbell electronic doorbell comprising an electronic doorbell, a visitor detection electronic doorbell coupled to the electronic doorbell wherein the visitor detection electronic doorbell comprises at least one of a button, a camera, a microphone, and a motion detector, and a light communicatively coupled to at least one of the electronic doorbell and the visitor detection electronic doorbell wherein the light is configured to project the illumination on a surface. In some embodiments, the method comprises receiving, by the doorbell electronic doorbell, a notification of a trigger event; and in response to the receiving, projecting, by the light, the illumination on the surface.

In some embodiments, the trigger event comprises at least one of a press of the button, an indication recorded by the camera, a sound detected by the microphone, and a motion detected by the motion detector.

In some embodiments, the method comprises emitting, by the light, the illumination through a lens and onto the surface, such that a design of the illumination is determined by the lens.

In some embodiments, the method comprises detachably coupling the lens to a housing of the electronic doorbell.

In some embodiments, the method comprises threadably coupling at least one mechanical adjustment mechanism to a housing of the electronic doorbell.

In some embodiments, the method comprises rotating the at least one mechanical adjustment mechanism in a first rotational direction, and in response to the rotating, adjusting a lens coupled to a housing of the electronic doorbell, the lens positioned such that the illumination is emitted through the lens and onto the surface whereby a design of the illumination is determined by the lens.

In some embodiments, the trigger event comprises at least one of powering on the electronic doorbell and providing power to the electronic doorbell.

The disclosure also include a doorbell system, comprising: an electronic doorbell; a visitor detection system coupled to the electronic doorbell, wherein the visitor detection system comprises at least one of a button, a camera, a microphone, a speaker, and a motion detector; and a light communicatively coupled to at least one of the electronic doorbell and the visitor detection system, wherein the light is configured to project an illumination on a surface.

In some embodiments, when the electronic doorbell is attached to a building the surface comprises at least one of a floor, a ground surface, and a wall located adjacent to the electronic doorbell.

In some embodiments, the light is configured to project the illumination in response to at least one of a press of the button, an indication of a presence of a visitor by the camera, a detection of sound by the microphone, and a detection of motion by the motion detector.

In some embodiments, the light is electrically and mechanically coupled to a printed circuit board located within a housing of the electronic doorbell.

In some embodiments, the system further comprises a remote computing device communicatively coupled to the doorbell system. The remote computing device may be configured to run a mobile application to thereby communicate with the doorbell system.

In some embodiments, the light is configured to project the illumination in response to activation of the mobile application.

In some embodiments, the system further comprises at least one lens detachably coupled to a housing of the electronic doorbell and arranged such that the illumination is emitted through the at least one lens and onto the surface. In some embodiments, the at least one lens is detachably coupled to the housing.

In some embodiments, the system further comprises a canister detachably coupled to a housing of the electronic doorbell; and at least one lens coupled to the canister whereby the at least one lens is substantially enclosed within the canister, wherein the at least one lens is arranged such that the illumination is emitted through the at least one lens and onto the surface. In some embodiments, the canister is configured to threadably couple to the housing.

In some embodiments, the at least one lens comprises at least one magnification lens and at least one focus lens, the system further comprising at least one film coupled to the canister whereby the at least one film is substantially enclosed in the canister, wherein the at least one film includes a design indicative of the illumination.

In some embodiments, the at least one magnification lens comprises three magnification lenses. In some embodiments, the at least one focus lens is located closer to the light source than the at least one magnification lens. In some embodiments, the at least one focus lens is located further from the light source than the at least one magnification lens.

In some embodiments, the at least one film is located between the at least one magnification lens and the at least one focus lens within the canister.

In some embodiments, the canister further comprises a protrusion extending from an outer surface of the canister, wherein the housing comprises a receiving channel configured to slideably receive the protrusion in order to achieve a desired orientation of the canister and the illumination.

In some embodiments, the system includes at least one mechanical adjustment mechanism threadably coupled to the housing, wherein the at least one lens is adjustable in a first direction in response to rotating the at least one mechanical adjustment mechanism in a first rotational direction and the at least one lens is adjustable in a second direction in response to rotating the at least one mechanical adjustment mechanism in a second rotational direction that is opposite the first rotational direction.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

COMPONENT INDEX

Figure 1:
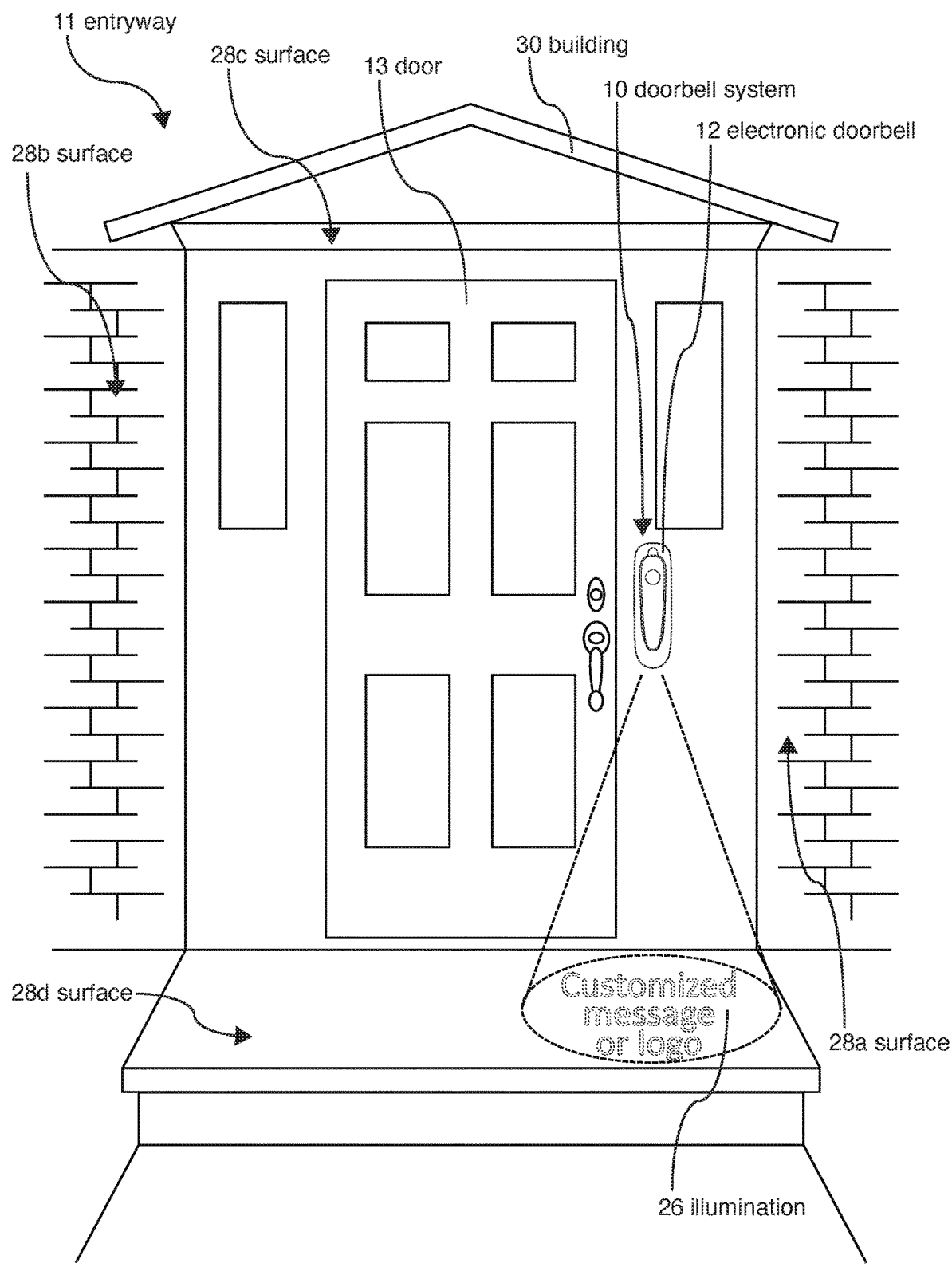
FIG. 1 illustrates a front view of a doorbell system coupled to a building, according to some embodiments.

10—doorbell system
11—entryway
12—electronic doorbell
13—door
14—visitor detection system
16—button
18—camera
19—speaker
20—microphone
22—motion detector
24—light
26—illumination
28—surface
30—building
32—floor/ground
34—removal device
38—remote computing device
40—mobile application
41—barrel assembly
42—at least one magnification lens
43—at least one focus lens
44—housing
46—at least one mechanical adjustment mechanism
56—bottom surface
60—at least one side surface
62—printed circuit board
64—canister
65—film holder
66—locking device FIG. 1 includes a front view of an entryway 11 to a building 30, including a door 13 that opens to reveal a walkway inside the building 30. FIG. 1 shows a front view of a doorbell system 10 including an electronic doorbell 12 (hereinafter "doorbell") configured to project an illumination 26 onto a surface 28. While not shown in FIG. 1, the doorbell 12 also includes a light 24 configured to project the illumination 26 onto surface 28. The doorbell 12 may be configured to project the illumination 26 onto the surface 28d directly in front of the doorbell 12, to either side on the ground surface 28d in front of the doorbell 12, and any other location viewable by a visitor. In some embodiments, the doorbell 12 is configured to project the illumination 26 onto any surface adjacent the entryway 11, such as surface 28a, 28b, 28c, 28d, and 28e. As shown in FIG. 1, the doorbell 12 is attached to the building 30 and located on a side surface 28a of the door 13. In some embodiments, the doorbell 12 is attached to any surface 28 on or adjacent the entryway, such as either surface 28a, 28b located on the side of the door 13, surface 28c located above the door 13, on the door 13 itself, surface 28d located on the ground in front of the door 13, and any other surface on the building 30.

In some embodiments, the doorbell 12 is configured to constantly (always) project the illumination 26. In some embodiments, the illumination 26 may be projected in response to a trigger, such as the press of a doorbell button 16, detection of sound by a microphone 20 of the visitor detection system 14, detection of motion by a motion detector 22 of the visitor detection system 14, detecting any indication of a presence of a visitor by the doorbell 12, powering on the electronic doorbell, providing power to the electronic doorbell, and the like. The illumination 26 may also be activated in response to a camera 18 of the visitor detection system 14 detecting an indication of a presence of a visitor.

Figure 2:
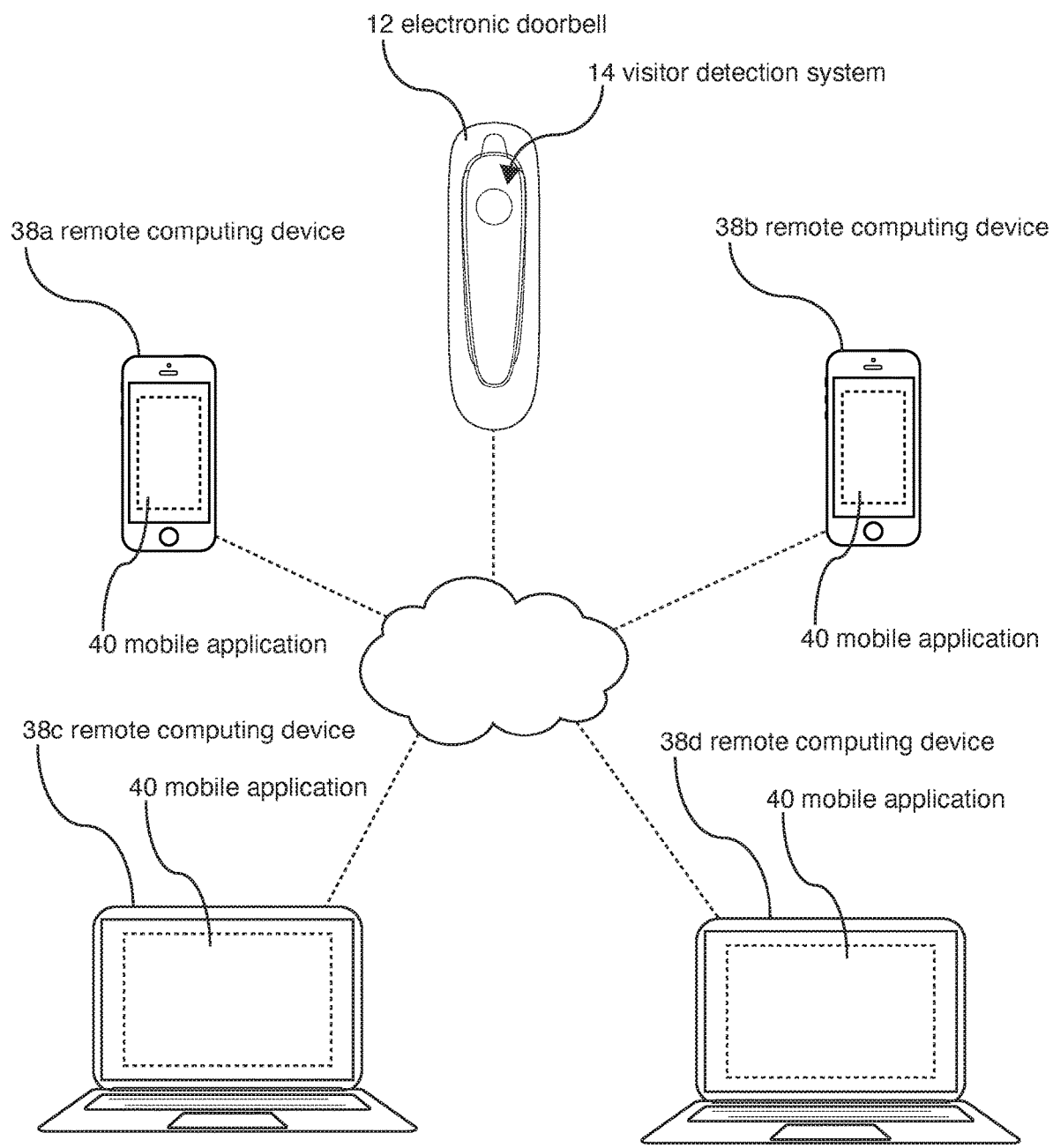
FIG. 2 illustrates an electronic doorbell communicatively coupled to a remote computing device, according to some embodiments.

FIG. 2 illustrates a doorbell 12 communicatively coupled to a remote computing device 38, such as a smart phone, tablet, laptop computer, desktop computer, wearable device, and the like. In some embodiments, the remote computing 38 allows a user to activate the light 24 located within the doorbell 12 to project the illumination 26 onto the surface 28. In some embodiments, the light 24 may be activated by any such trigger described above and including, but not limited to: waking up the remote computing device 38, activating the mobile application 40, a predetermined time of day occurring, a predetermined event occurring, and the like. It should be appreciated that any function performed on or by the remote computing device 38 or anything detected by the doorbell 12 may trigger the doorbell 12 to project the illumination 26 from the light 24 onto the surface 28.

Figure 3:
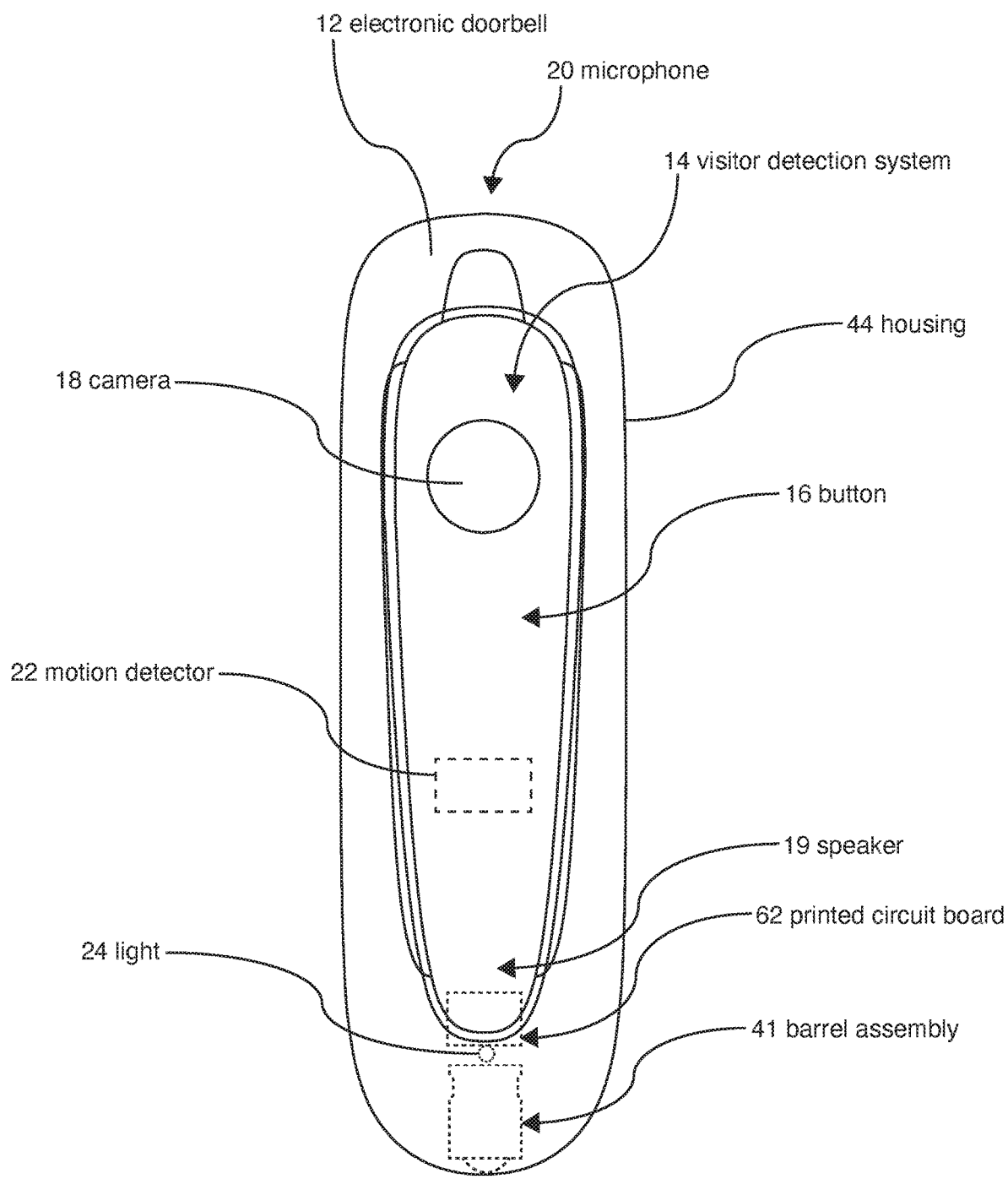
FIG. 3 illustrates a front view of an electronic doorbell showing the various components, according to some embodiments.
Figure 4:
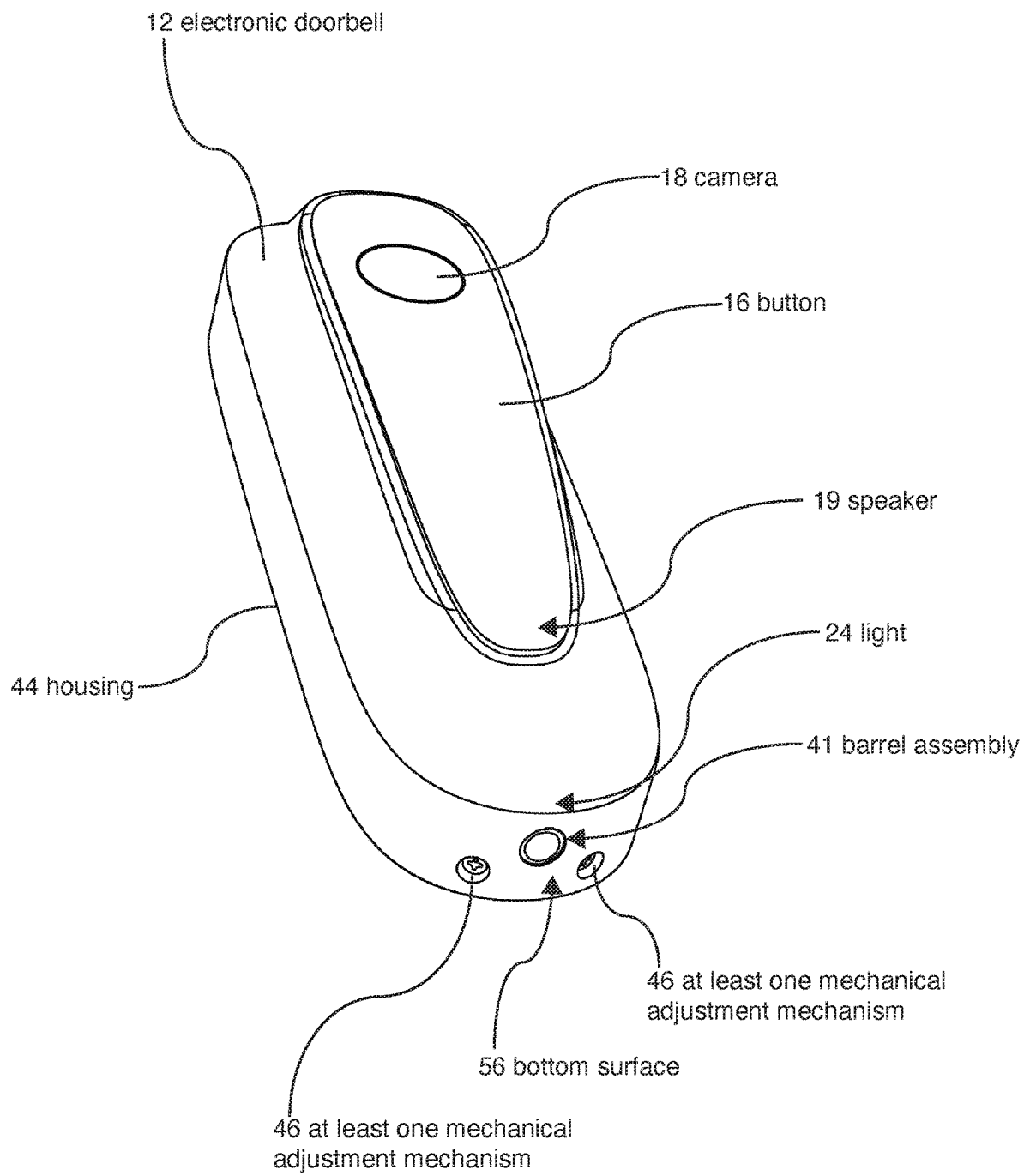
FIG. 4 illustrates a bottom perspective view of an electronic doorbell showing the various components, according to some embodiments.

As shown in FIGS. 3 and 4, the doorbell 12 may include a housing 44, a visitor detection system 14, a button 16, a camera 18, a speaker 19, a microphone 20, a motion detector 22, and at least one mechanical adjustment mechanism 46. In some embodiments, rotation of the at least one mechanical adjustment mechanism 46 may be allow a user to adjust the focus, intensity, and/or location of the illumination 26. Even still, in some embodiments, by rotating the at least one mechanical adjustment mechanism 46 this may allow the user to remove the housing 44. In some embodiments, when the at least one mechanical adjustment mechanism 46 is rotated in a first rotational direction, such as clockwise or counterclockwise, in response the barrel assembly 41 may move in a first direction. The first direction may comprise movement in a left direction, a right direction, an upward direction, a downward direction, zooming the lens inward, zooming the lens outward, and the like. Additionally, when the at least one mechanical adjustment mechanism 46 is rotated in the second rotational direction that is opposite the first rotational direction, in response the barrel assembly 41 may according move in a second direction. The second direction may comprise movement in a left direction, a right direction, an upward direction, a downward direction, zooming the lens inward, zooming the lens outward, and the like. Generally, the first direction and second direction may comprise up, down, left, right, zoom, focus, intensity, or any other suitable adjustment.

Figure 5:
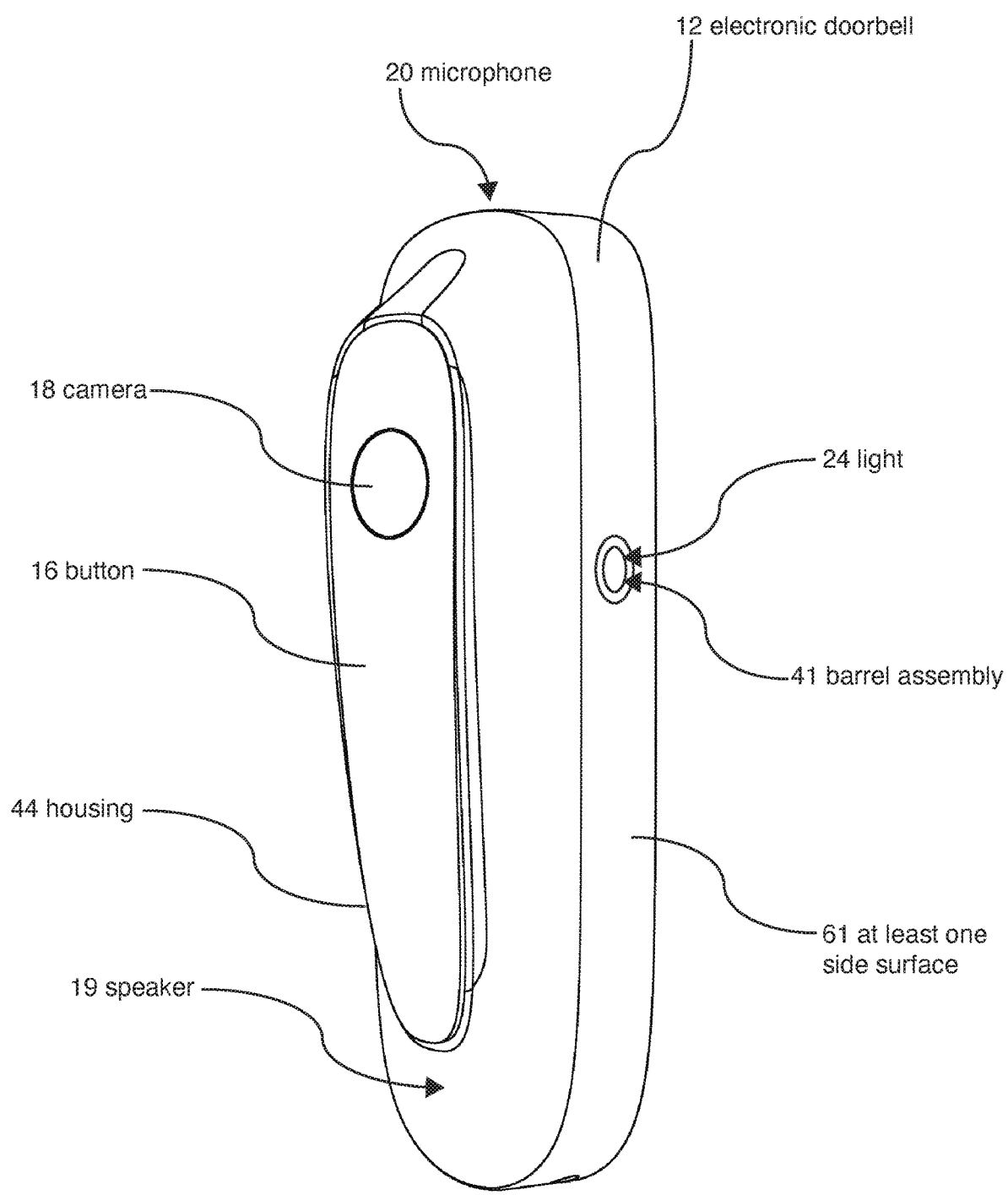
FIG. 5 illustrates a side perspective view of an electronic doorbell showing the various components, according to some embodiments.

With continued reference to FIGS. 3 and 4, the doorbell 12 may include a printed circuit board 62, a light 24 (such as a white light emitting diode "LED"), and a barrel assembly 41 coupled to a bottom surface 56 of the housing 44 in order to project the illumination 26 downward. As shown in FIG. 5, in some embodiments, the light 24 and barrel assembly 41 are coupled to at least one side surface 60 of the housing 44. Furthermore, in some embodiments, the light 24 and barrel assembly 41 may be coupled to a top surface of the housing 44. In such embodiments, the illumination 26 may be projected to the side of the doorbell 12, downward below the doorbell 12, or upward above the doorbell 12. For example, the illumination 26 may be projected onto at least one surface 28a, 28b, 28c, and 28d located adjacent the doorbell 12.

Figure 6A:
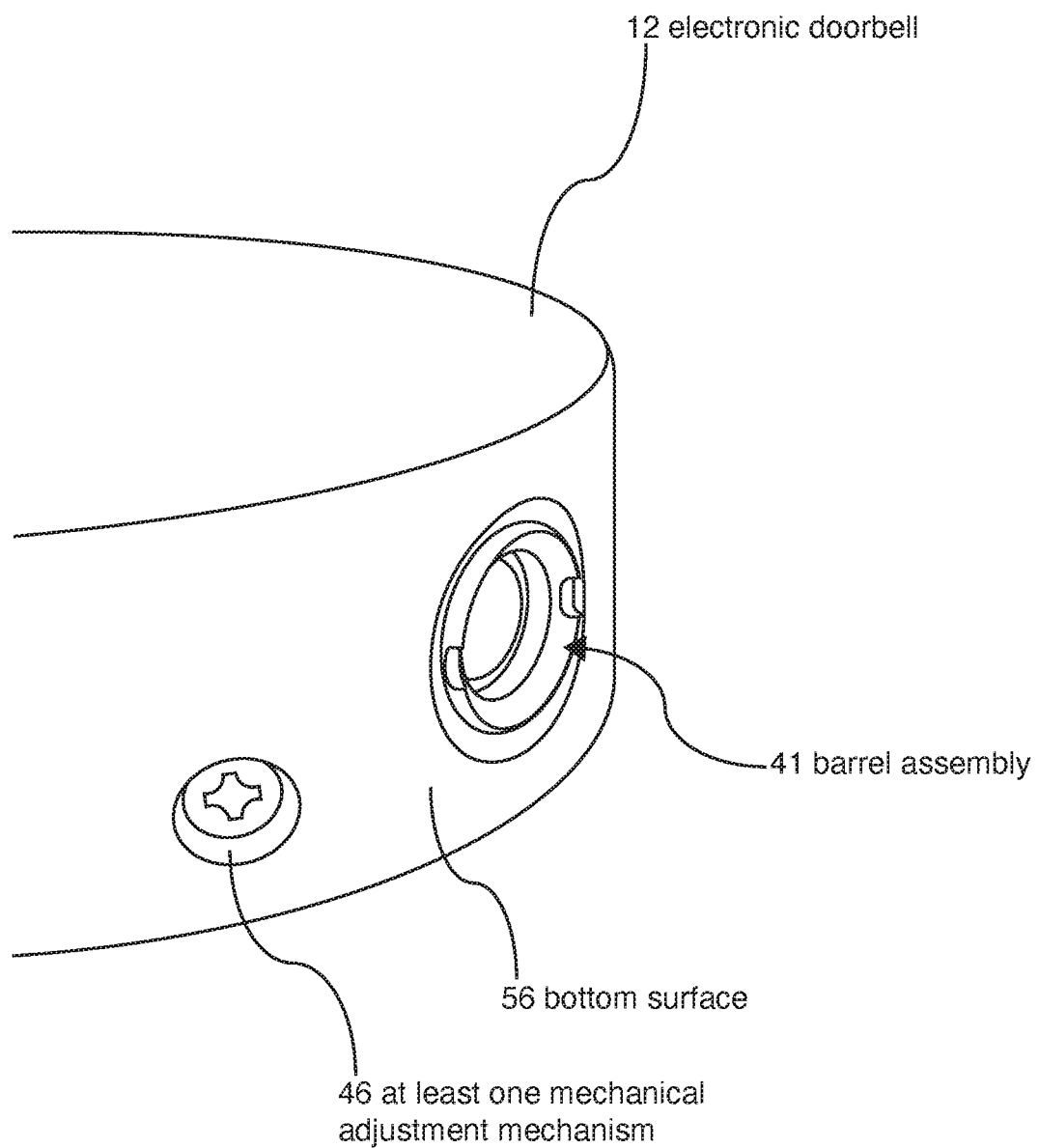
FIGS. 6A and 6B illustrate a bottom surface of the electronic doorbell showing the barrel assembly and how to remove the barrel assembly, according to some embodiments.
Figure 6B:
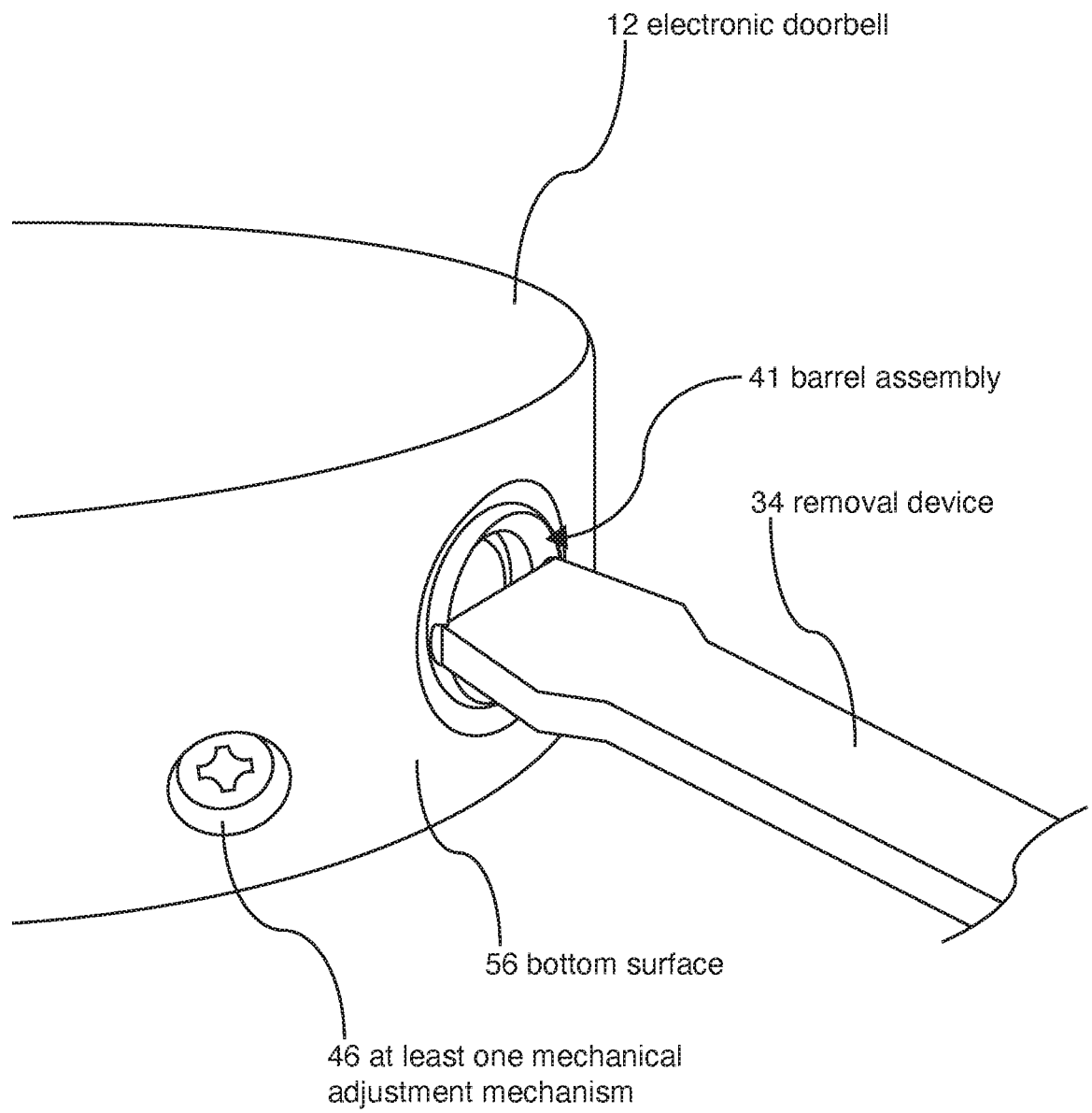

Now, with reference to FIG. 6a, the barrel assembly 41 is illustrated having indentations along an outward facing surface of the barrel assembly 41. As shown in FIG. 6b, the indentations are configured to receive a removal device 34, such as a screwdriver tip or even a coin, whereby rotation of the removal device 34 will allow the barrel assembly 41 to be removed from the housing.

Figure 7A:
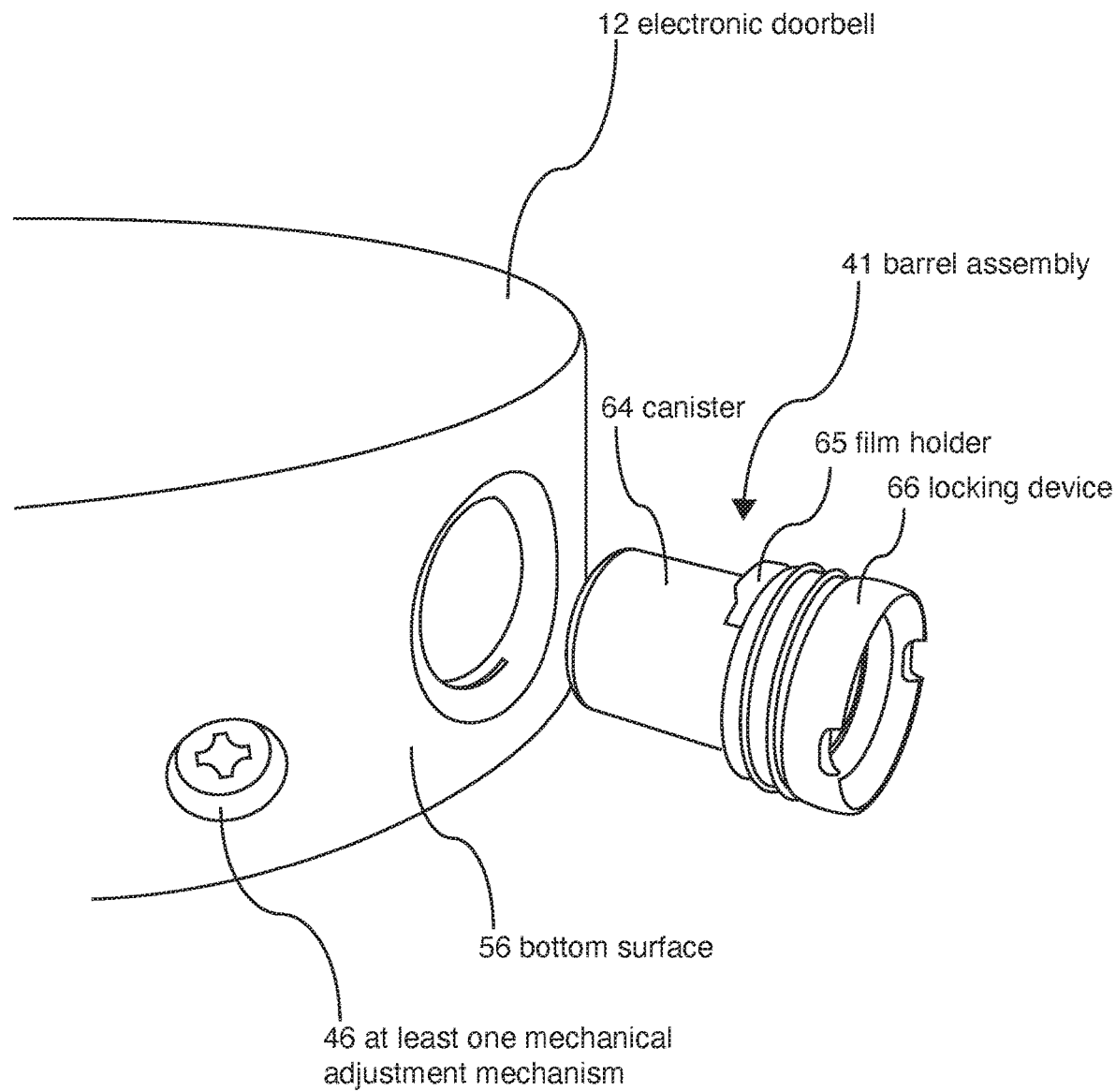
FIGS. 7A, 7B, and 7C illustrate a bottom surface of the electronic doorbell showing how to replace the barrel assembly and the film holder, according to some embodiments.

FIG. 7a shows that the barrel assembly 41 may be completely removed from the housing 44. As illustrated, the barrel assembly 41 may comprise a locking device 66 configured to both receive the removal device 34 and threadably couple to the housing 44. The barrel assembly 41 may also include a canister 64 having a protrusion configured to receive film holder 65. The film holder 65 includes a film that determines what illumination 26 is projected on the surface 28 via the light 24. In other words, when light 24 is illuminated, the light passes through the inside of the canister 64, through the film holder 65 and away from the outward facing portion of the barrel assembly 41 whereby the illumination 26 is projected onto the surface 28.

Figure 7B:
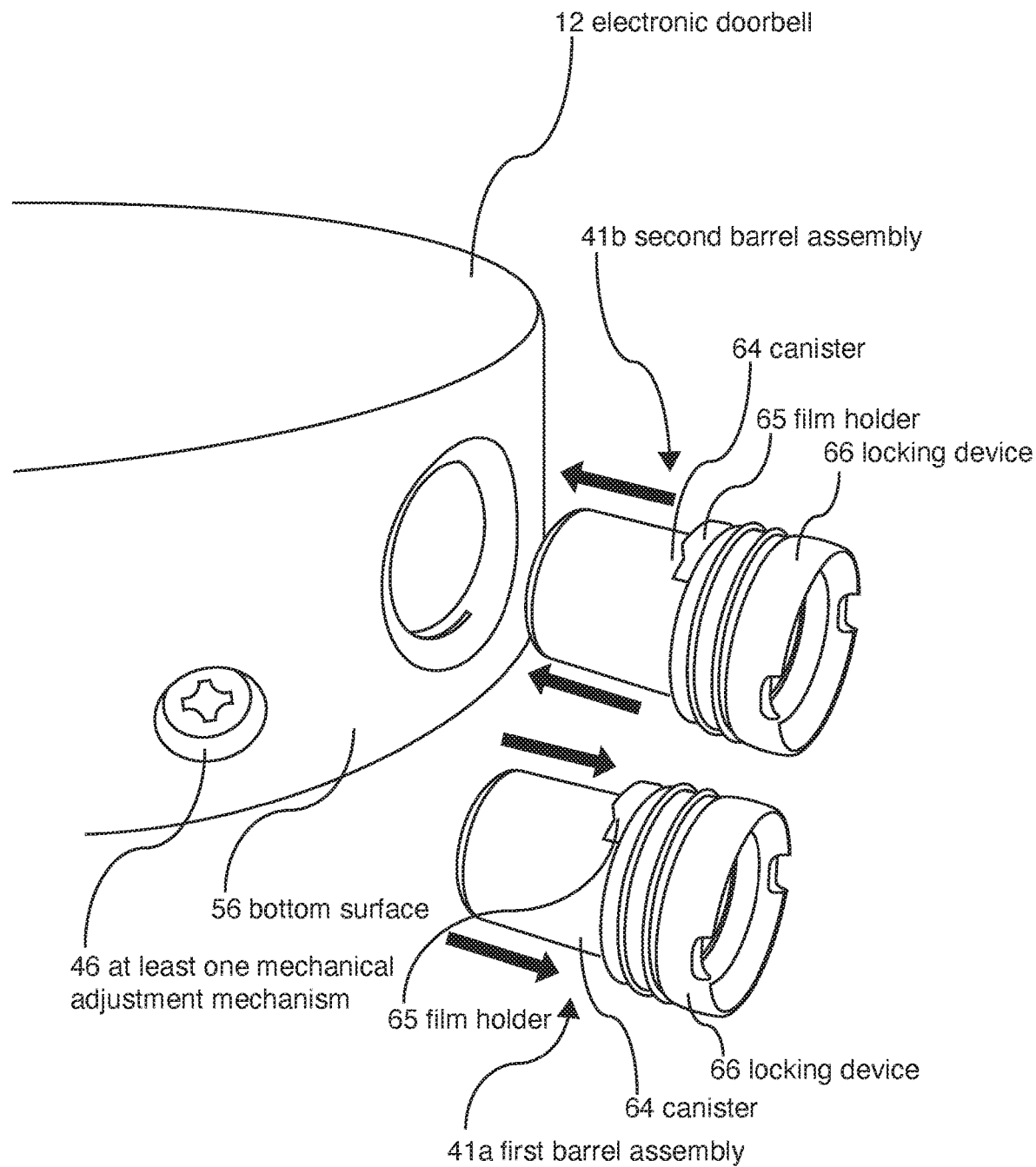

The doorbell 12 may be configured to project a variety of different illumination designs. As illustrated in FIG. 7b, the doorbell 12 may project different illumination designs by removing a first barrel assembly 41a and replacing it with a second barrel assembly 41b. The first barrel assembly 41a may include a first film having a first illumination design while the second barrel assembly 41b includes a second film having a second illumination design that is different from the first illumination design. In other words, if the doorbell 12 is currently projecting an illumination stating "Welcome to our home" (via a first barrel assembly 41a) and the user wishes to project a different message stating "Go Phillies!" (via a second barrel assembly 41b), the user would insert the removal device 34 into the first barrel assembly 41 and rotate the removal device a first rotational direction to thereby remove the first barrel assembly 41a from the housing 44, specifically from the aperture located on the bottom surface 56 of the housing 44. The user would then insert the second barrel assembly 41b into the aperture located on the bottom surface 56 of the housing 44, position the removal device 34 within the indentations of the second barrel assembly 41b, and rotate the removal device a second direction opposite the first direction to thereby fasten the second barrel assembly 41b to the housing 44.

Figure 7C:
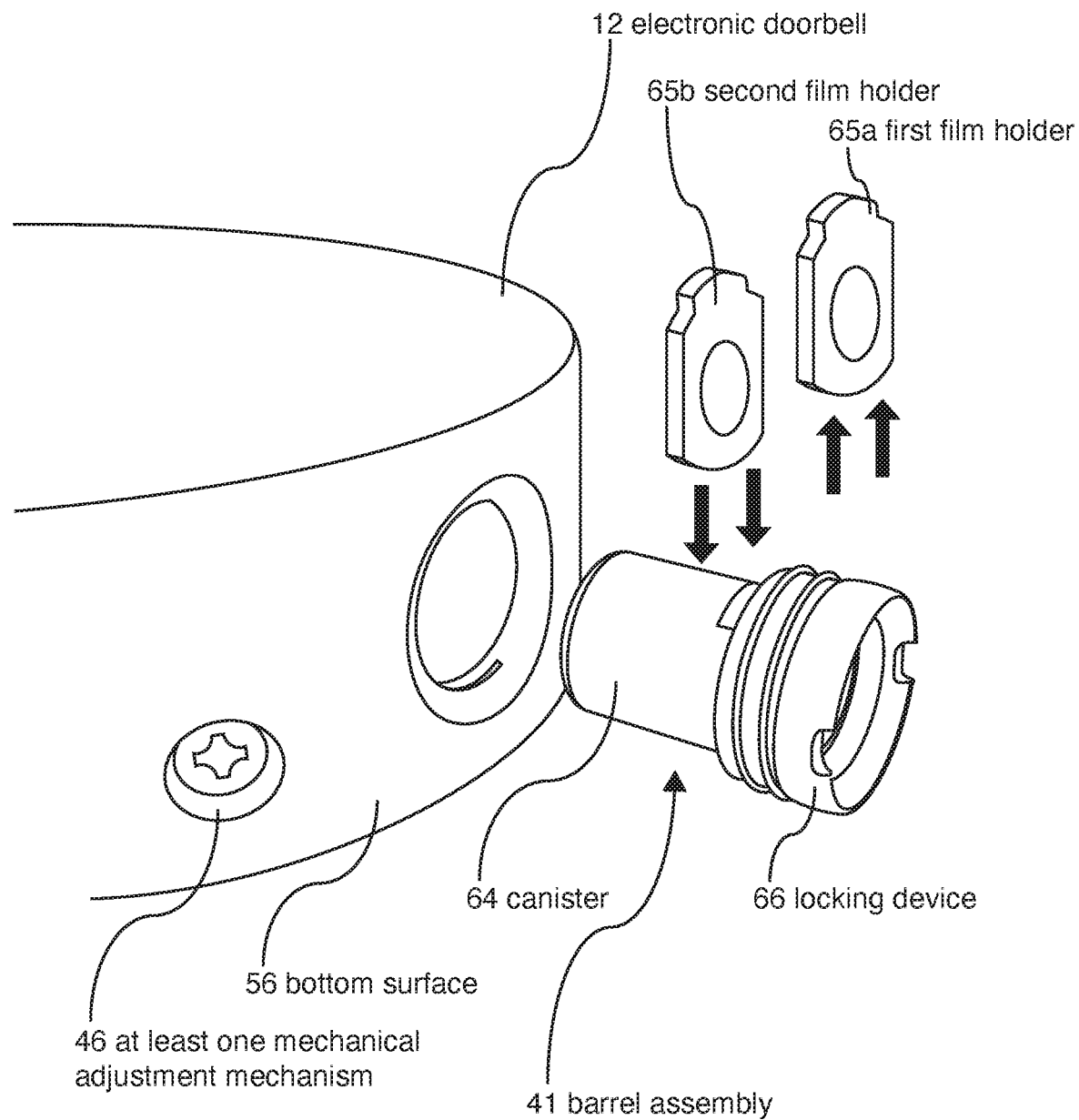

FIG. 7c illustrates yet another way of changing the illumination design being projected from the doorbell 12. As shown in FIG. 7c, rather than swapping entire barrel assemblies, a user may instead swap out film holders 65. More specifically, a first film holder 65a may include a first film having a first illumination design while a second film holder 65b includes a second film having a second illumination design that is different from the first illumination design. In other words, if the doorbell 12 is currently projecting an illumination stating "Home protected by Honeywell®" (via the first film holder 65a) and the user wishes to project a different message stating "Happy Birthday Talia!" (via the second film holder 65b), the user would insert the removal device 34 into the barrel assembly 41 and rotate the removal device a first rotational direction to thereby remove the barrel assembly 41 from the housing 44. The user would then slideably remove the first film holder 65a from the barrel assembly 41 and replace the first film holder 65a with the second film holder 65b. The user would thereby insert the barrel assembly 41 (having the second film holder 65b attached) into the aperture located on the bottom surface 56 of the housing 44, position the removal device 34 within the indentations of the barrel assembly 41, and rotate the removal device the second rotational direction to fasten the barrel assembly 41 to the housing 44.

It should be appreciated that the doorbell 12 may project any illumination 26 having any type of message, illustration, and the like. For example, some illuminations 26 may only include words, while others include only illustrations, while others include a combination of words and illustrations or designs. Generally, by giving users the ability to project custom messages from the barrel assembly 41, this allows a user to customize an area of their home or business and provide a message(s) or image(s) to visitors and/or passersby to draw attention, provide information, and the like.

Figure 8:
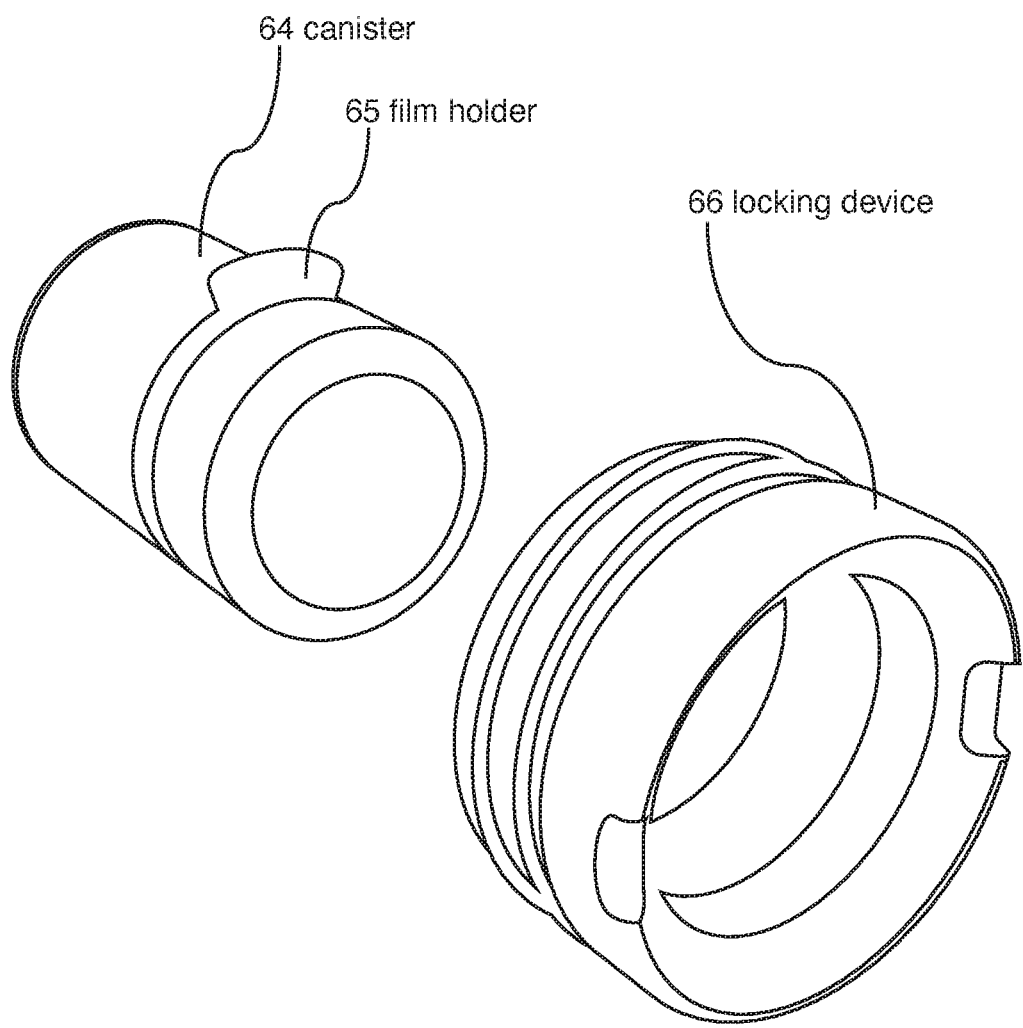
FIG. 8 illustrates an exploded view of the barrel assembly, according to some embodiments.

FIG. 8 illustrates a partially exploded view of the barrel assembly 41 with the locking device 66 decoupled from the canister 64. As shown, the barrel assembly 41 includes locking device 66 with an optional gasket to seal the inside of the housing 44 so moisture does not enter the housing 44. Additionally, the barrel assembly 41 may include canister 64 having an aperture configured to receive film holder 65. In some embodiments, the locking device 66 is a separate component from the canister 64 that attaches to the canister via a friction fit. In some embodiments, the locking device 66 is contiguous or one with the canister 64. In some embodiments, doorbell 12 includes a sealing gasket located between the light source and the barrel assembly 41 such most of, if not all of, the light from the light source is directed through the barrel assembly 41.

Figure 9:
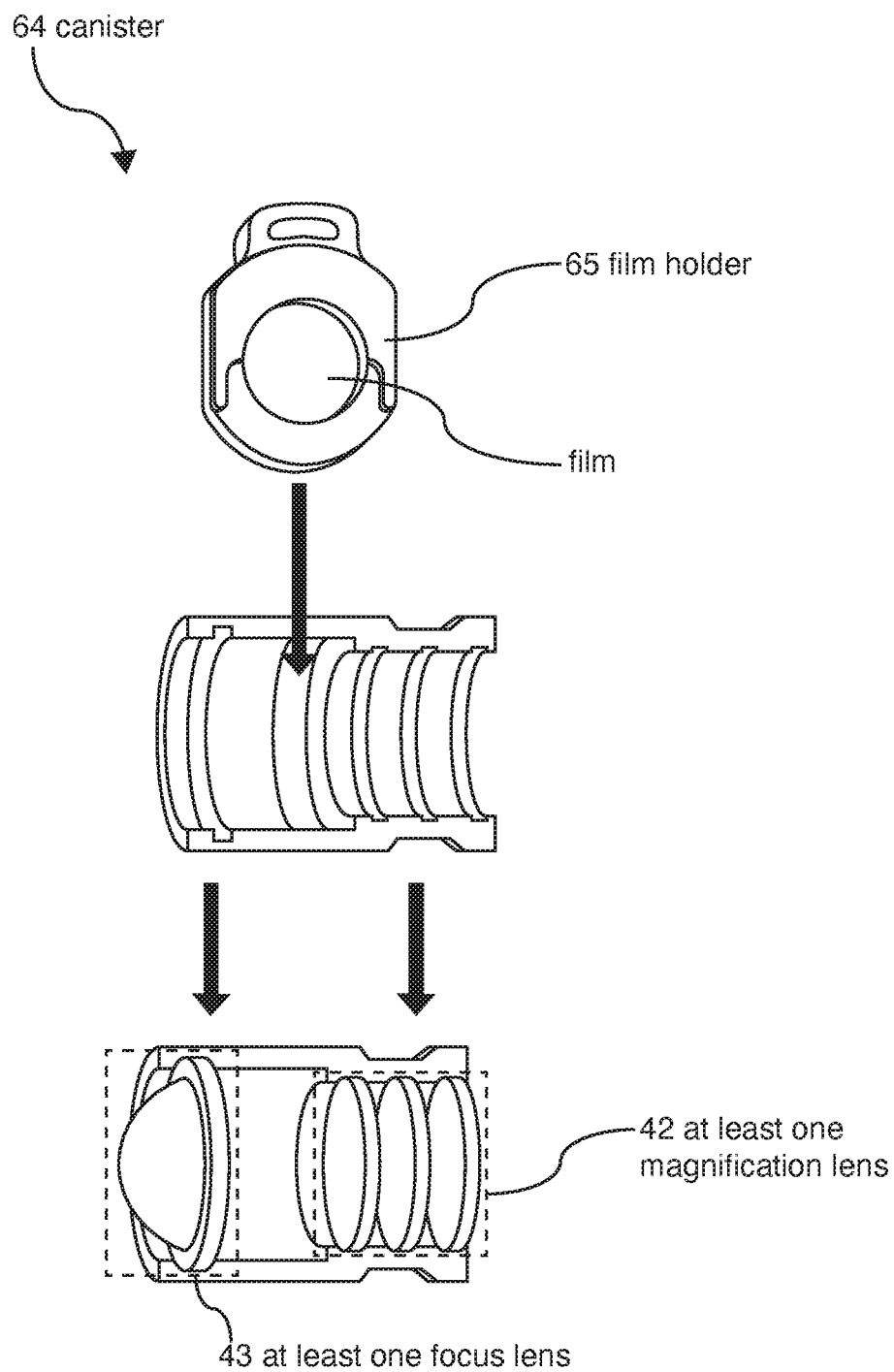
FIG. 9 illustrates a cutaway of the barrel assembly and its components, according to some embodiments.

FIG. 9 includes an exploded view of the barrel assembly 41 showing the internal components. As shown in FIG. 9, in some embodiments, the barrel assembly 41 includes at least one magnification lens 42 and at least one focus lens 43. When the barrel assembly 41 is coupled to the housing 44, the at least one magnification lens 42 may be located adjacent to the light 24. In this regard, light from the light 24 passes through the at least one magnification lens 42 whereby the light rays are magnified. As the magnified light rays then pass through the film located within film holder 65, the images on the film act like a series of multicolored filters. The filtered light, carrying the image on the film, then passes through the at least one focus lens 43 that spreads the light out and focuses it onto the surface 28. In some embodiments, the at least one magnification lens 42 comprises one magnification lens, two magnification lenses, three magnification lenses, four magnification lenses, five magnification lenses, six magnification lenses, seven magnification lenses, eight magnification lenses, nine magnification lenses, and ten or more magnification lenses. In some embodiments, the at least one focus lens 43 comprises one focus lens, two focus lenses, three focus lenses, four focus lenses, five focus lenses, six focus lenses, seven focus lenses, eight focus lenses, nine focus lenses, and ten or more focus lenses.

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. An electronic doorbell, comprising:
   a housing;
   a button coupled to the housing;
   a camera coupled to the housing;
   a microphone coupled to the housing;
   a speaker coupled to the housing;
   a motion detector coupled to the housing;
   a light source coupled to the housing; and
   a canister coupled, via a locking device, to a bottom surface of the housing adjacent the light source, wherein the canister comprises at least one lens and a film coupled to a film holder, wherein the at least one lens comprises at least one magnification lens and at least one focus lens, and wherein the at least one lens is configured to allow light from the light source to pass through the at least one lens such that when the electronic doorbell is attached to a building the light source projects an illumination onto a ground surface in front of the electronic doorbell.

2. The electronic doorbell of claim 1, wherein the film is coupled to the housing adjacent the at least one lens whereby the film comprises a light filter corresponding to the illumination.

3. The electronic doorbell of claim 1, wherein the at least one magnification lens is configured to magnify the light from the light source.

4. The electronic doorbell of claim 3, wherein the at least one magnification lens comprises a first magnification lens, a second magnification lens, and a third magnification lens.

5. The electronic doorbell of claim 3, wherein the at least one focus lens is configured to spread the light and focus the illumination onto the ground surface.

6. The electronic doorbell of claim 1, wherein the light source is configured to constantly project the illumination.

7. The electronic doorbell of claim 1, wherein the light source is configured to project the illumination in response to a press of the button.

8. The electronic doorbell of claim 1, wherein the light source is configured to project the illumination in response to an indication of a presence of a visitor by the camera.

9. The electronic doorbell of claim 1, wherein the light source is configured to project the illumination in response to a detection of a sound by the microphone.

10. The electronic doorbell of claim 1, wherein the light source is configured to project the illumination in response to a detection of a motion by the motion detector.

11. The electronic doorbell of claim 1, further comprising a remote computing device communicatively coupled to the electronic doorbell, wherein the remote computing device is configured to run a mobile application, wherein the electronic doorbell is configured to project the illumination in response to an input on the mobile application.

12. The electronic doorbell of claim 1, wherein the canister is detachably coupled to the housing.

13. The electronic doorbell of claim 1, further comprising at least one mechanical adjustment mechanism threadably coupled to the housing, wherein the at least one lens is adjustable in a first direction in response to rotating the at least one mechanical adjustment mechanism in a first rotational direction and the lens is adjustable in a second direction in response to rotating the at least one mechanical adjustment mechanism in a second rotational direction that is opposite the first rotational direction.

14. A method of projecting an illumination by a doorbell comprising an electronic doorbell, a visitor detection electronic doorbell coupled to the electronic doorbell wherein the visitor detection electronic doorbell comprises at least one of a button, a camera, a microphone, and a motion detector, and a light communicatively coupled to at least one of the electronic doorbell and the visitor detection electronic doorbell wherein the light is configured to project the illumination on a surface, the method comprising:
   detachably coupling, via a locking device, a canister comprising the lens to a housing of the electronic doorbell;
   receiving, by the electronic doorbell, a notification of a trigger event; and
   in response to the receiving, projecting, by the light, the illumination on the surface, wherein the projecting comprises emitting, by the light, the illumination through the lens and onto the surface, such that a design of the illumination is determined by the lens.

15. The method of claim 14, wherein the trigger event comprises a press of the button.

16. The method of claim 14, further comprising threadably coupling at least one mechanical adjustment mechanism to a housing of the electronic doorbell.

17. The method of claim 16, further comprising:
   rotating the at least one mechanical adjustment mechanism in a first rotational direction; and
   in response to the rotating, adjusting a lens coupled to a housing of the electronic doorbell, the lens positioned such that the illumination is emitted through the lens and onto the surface whereby a design of the illumination is determined by the lens.

18. The method of claim 14, wherein the trigger event comprises at least one of powering on the electronic doorbell and providing power to the electronic doorbell.

19. The method of claim 14, wherein the trigger event comprises at least one of an indication of motion recorded by the camera and a sound detected by the microphone.

20. The method of claim 14, wherein the trigger event comprises a motion detected by the motion detector.

* * * * *